United States Patent [19]

Ishimura et al.

[11] Patent Number: 5,117,251
[45] Date of Patent: May 26, 1992

[54] REFLEX CAMERA

[75] Inventors: Toshihiko Ishimura; Reiji Seki; Kenji Ishibashi; Junichi Tanii; Takahisa Shimada, all of Osaka, Japan

[73] Assignee: Minolta Camera Kabushiki Kaisha, Osaka, Japan

[21] Appl. No.: 672,770

[22] Filed: Mar. 20, 1991

Related U.S. Application Data

[63] Continuation of Ser. No. 352,548, May 12, 1989, abandoned.

[30] Foreign Application Priority Data

May 13, 1988 [JP] Japan .................. 63-117442

[51] Int. Cl.⁵ .................. G03B 13/36; G03B 17/38
[52] U.S. Cl. .................. 354/400; 354/484; 354/266
[58] Field of Search .......... 354/400, 402, 412, 266, 354/173.1, 173.11, 484, 152

[56] References Cited

U.S. PATENT DOCUMENTS

| | | | |
|---|---|---|---|
| 3,846,812 | 11/1974 | Biber | 354/145 |
| 4,201,463 | 5/1980 | Harigaya et al. | 354/86 |
| 4,435,058 | 3/1984 | Yoshida et al. | 354/173.1 |
| 4,464,037 | 8/1984 | Terui et al. | 354/266 X |
| 4,659,201 | 4/1987 | Suzuki et al. | 354/152 |
| 4,816,856 | 3/1989 | Hamada et al. | 354/402 |
| 4,841,324 | 6/1989 | Ogasawara | 354/266 X |

FOREIGN PATENT DOCUMENTS 62-253107  11/1987  Japan .

Primary Examiner—W. B. Perkey
Attorney, Agent, or Firm—Burns, Doane, Swecker & Mathis

[57] ABSTRACT

A reflex camera capable of automatic focus adjustment comprises a motor for driving a lens used for focus adjustment, an electromagnet for lifting-up a mirror to expose a film at the time of shutter release, a battery for operating the motor and the electromagnet, and a controller for controlling power supply such that the power is supplied to the magnet after the lens is moved by the motor to a position such as an in-focus point. Since the power is supplied to the electromagnet after the completion of power supply to the motor, there is no possibility of malfunction of the electromagnet.

9 Claims, 15 Drawing Sheets

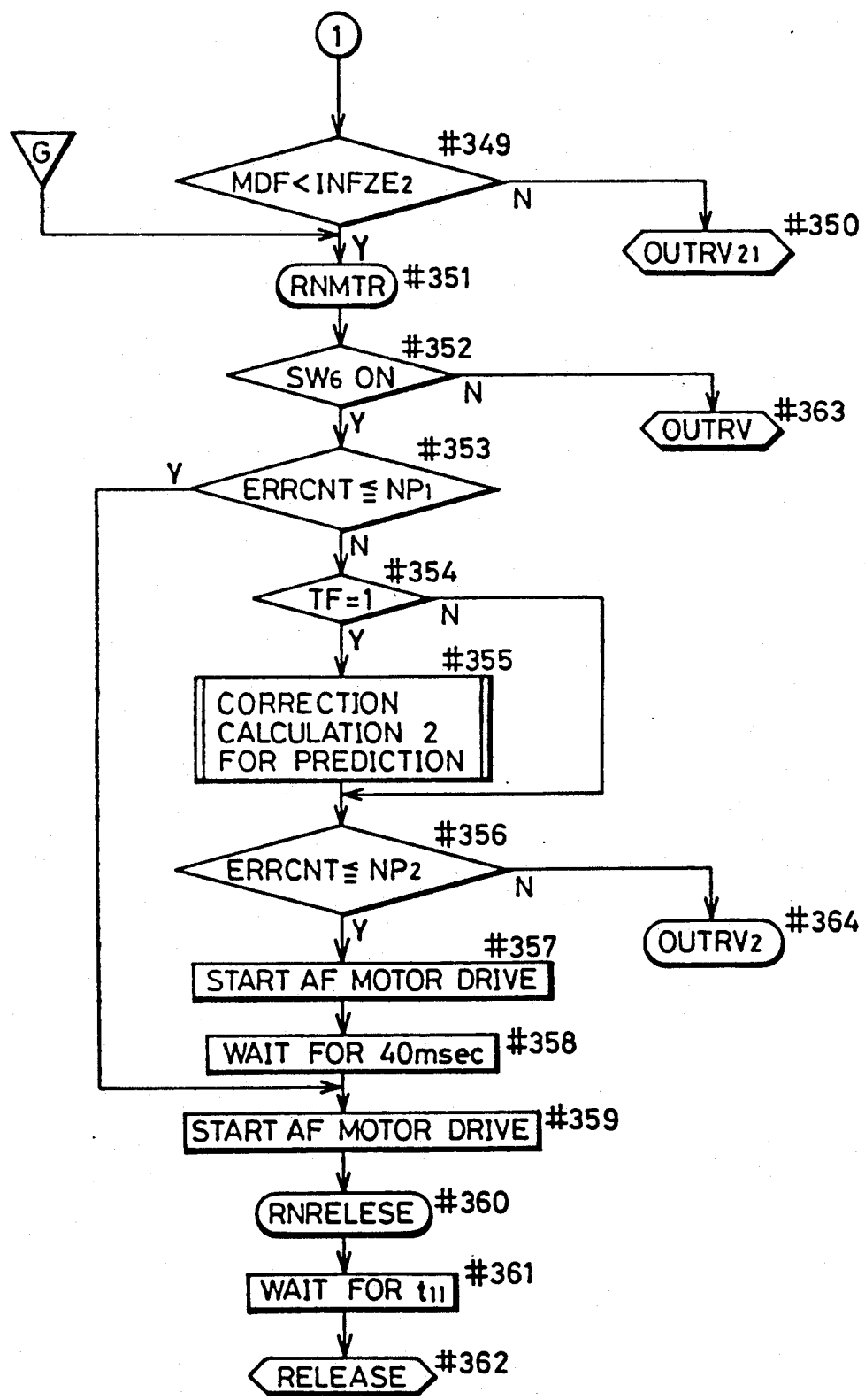

REFLEX CAMERA

This application is a continuation of application Ser. No. 352,548, filed May 12, 1989, now abandoned.

BACKGROUND OF THE INVENTION

1. Field of the Invention

The present invention relates to a reflex camera having automatic focus adjusting function in which a lens for adjusting focus is driven to an in-focus point corresponding to a result of focus detection. More specifically, the present invention relates to a reflex camera in which malfunctions are prevented.

2. Description of the Related Art

Basically, a camera having automatic focus adjusting function is adapted to be operated in a one shot AF mode in which focus adjustment is locked once an in-focus condition has attained. When the one shot AF mode is employed, a focus priority release mode is also used, in which the shutter is not released until the in-focus condition is realized. Therefore, in a conventional camera having automatic focus adjusting function, the lens has been driven to and kept at the in-focus point when the shutter is released.

However, in a camera having automatic focus adjusting function in which a continuous photographing mode for taking photographs continuously and a prediction mode in which the lens is driven while predicting the movement of an object are both used, the driving of the lens should be carried out during a release sequence. In a reflex camera, an electromagnet is rendered conductive for displacing a mirror from an optical axis of a photographic lens during the release sequence. If the motor for driving the lens is being driven while the electromagnet is rendered conductive, malfunctions such as failure of mirror lifting-up may possibly occur, since sufficient current cannot be supplied to the electromagnet.

SUMMARY OF THE INVENTION

Therefore, one object of the present invention is to prevent the lens driving for automatic focus adjustment from disturbing mirror lifting-up operation in a release sequence in a reflex camera.

Another object of the present invention is to prevent operation of one part from affecting operation of other parts in a reflex camera.

A further object of the present invention is to prevent defocus caused by inertia of a motor for automatic focus adjustment in a reflex camera.

The above described objects of the present invention can be attained by a reflex camera of the present invention, comprising: a first actuator; a second actuator; a battery for supplying electric power to the first and second actuators; an interrupter for interrupting the power supply to the first actuator and a controller for controlling the interrupter such that the power supply to the first actuator is interrupted when the second actuator is actuated.

Since the reflex camera comprises the above described components, the first and second actuators are not both operated simultaneously. Therefore, parts attached to respective actuators are not simultaneously operated. Consequently, operation of one part does not affect operation of other parts in a reflex camera.

According to another aspect of the present invention, the reflex camera comprises: a first actuator; a second actuator; a battery for supplying electric power to the first and second actuators; an interrupter for interrupting the power supply to the first actuator; a controller for controlling the interrupter such that the power supply to the first actuator is interrupted when the second actuator is actuated; a driven member driven by the first actuator; a monitor apparatus detecting an amount of movement of the driven member to output a detection signal when the amount of movement reaches a prescribed value; and a movement stopping apparatus responsive to the detecting signal for stopping the movement of the first actuator.

Since the reflex camera comprises the above described components, even if the driven member is moved by inertia, the driven member can be stopped since the first actuator is stopped by the movement stopping apparatus. Consequently, assuming that the first actuator is the motor for automatic focus adjustment and the driven member is a lens, defocus derived from inertia of the motor for automatic focus adjustment can be prevented in a reflex camera.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

A camera in a preferred embodiment according to the present invention will be described hereinafter with reference to the accompanying drawings.

Figure 1:
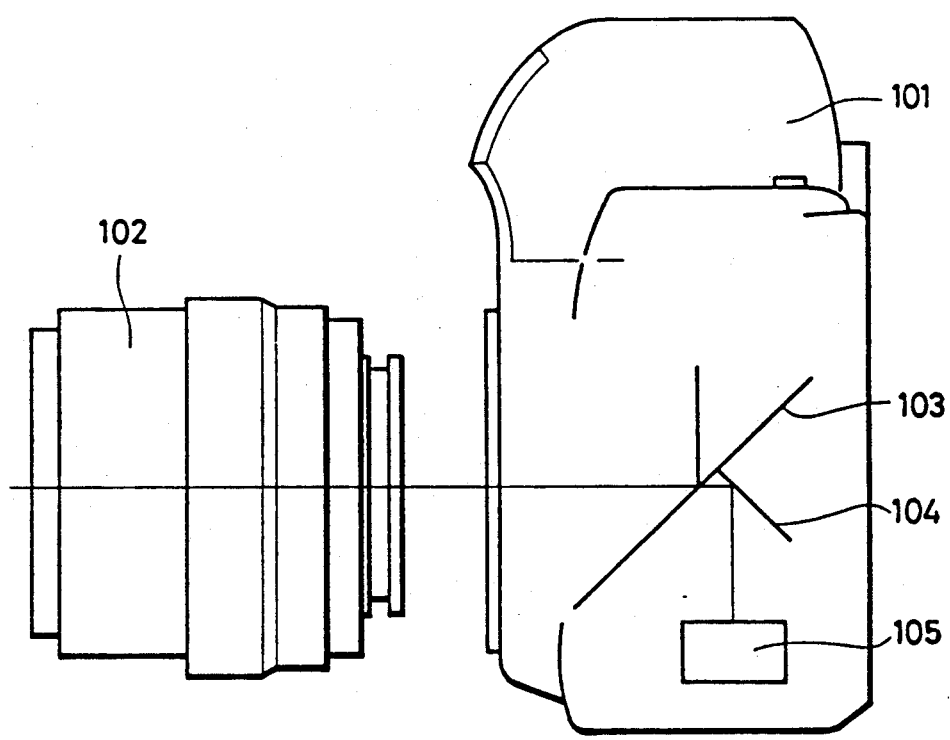
FIG. 1 is a side view of a camera embodying the present invention.
Figure 2:
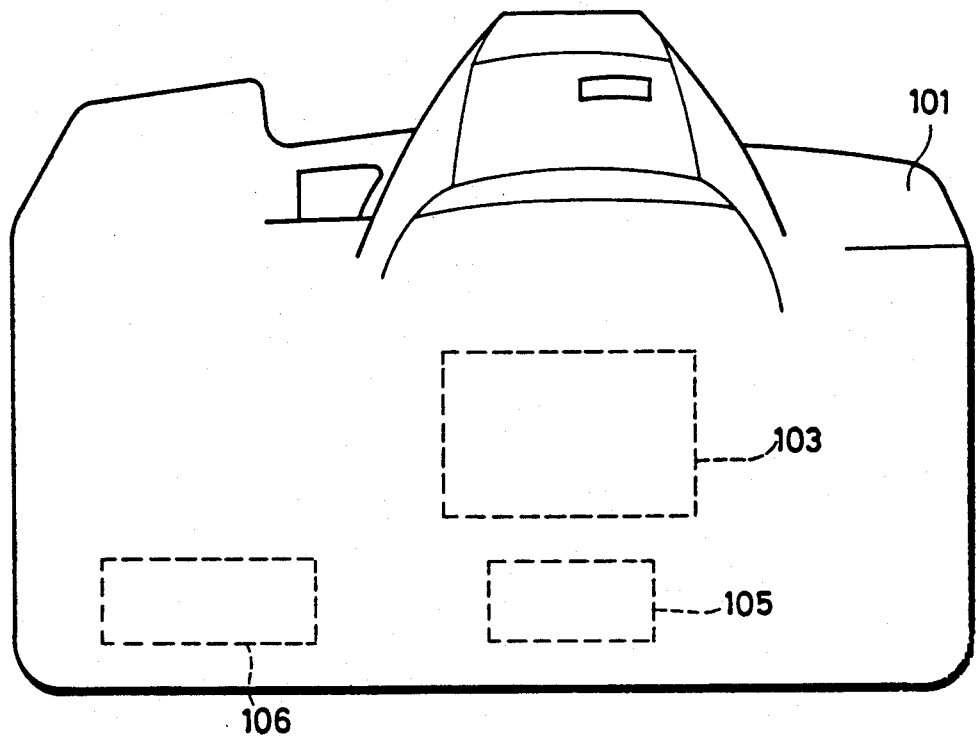
FIG. 2 is a front view of the camera of FIG. 1.

Referring to FIG. 1, a single-lens reflex camera comprises a camera body 101 and an interchangeable zoom lens (photographic lens) 102. Contained in the camera body 101 are a main mirror 103, a submirror 104, a focus detecting module 105, and a mechanism 106 for a series of automatic operations for lifting up the mirrors 103 and 104, exposure, film winding and film rewinding. The mirrors 103 and 104, the focus detecting module 105 and the mechanism 106 are not directly related with the present invention, and hence the description thereof will be omitted. FIG. 2 is a front view of the camera body 101. The main mirror 103 has a reflective portion and a semitransparent portion. Most part of light passed through the photographic lens 102 is reflected by the reflective portion of the main mirror 103 toward an optical system of the finder, not shown. The rest part of the light passed through the photographic lens 102 passes through the main mirror 103, falls on the submirror 104 and is reflected by the submirror 104 toward the focus detecting module 105.

Figure 3:
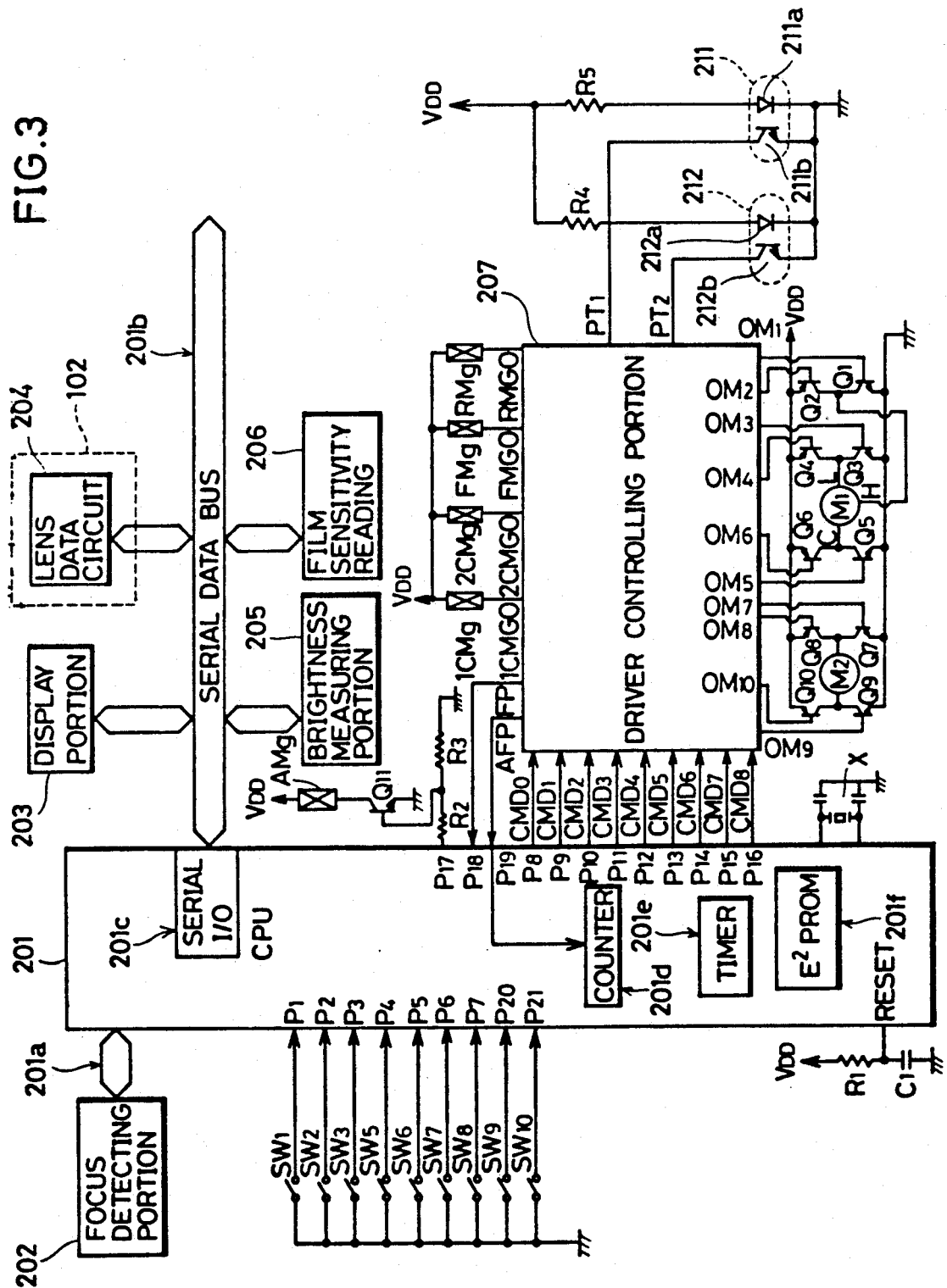
FIG. 3 is a circuit diagram of a control system incorporated into the camera of FIG. 1.

FIG. 3 is a circuit diagram of an electronic circuit employed in the camera of the present invention. Referring to FIG. 3, the control circuit comprises a central processing unit 20 (hereinafter abbreviated to "CPU"), i.e., a microcomputer, for controlling the sequential operation of the camera, exposure calculation and automatic focusing operation, a focus detecting unit 202 for detecting the amount of defocus, a display unit 203, such as liquid crystal display LCD or a light emitting diode display LED, a photometric unit 205 for measuring the brightness Bv of an object, a film sensitivity read unit 206 for automatically reading the sensitivity of a loaded film, a sequence motor $M_1$ for winding-up and rewinding the film, an AF motor $M_2$ for driving the photographic lens for automatic focusing, and a driver controller 207 for energizing magnets for exposure operation and the motors $M_1$ and $M_2$. Information provided by a lens data circuit 204 in the interchangeable lens 102 includes lens data such as a full open diaphragm aperture value, a maximum diaphragm aperture value, a focal length and a convergence efficiency (coefficient to exchange defocus amount to revolution of the motor $M_2$). Information of the display 203, the lens data circuit 204, the photometric unit 205 and the film sensitivity read unit 206 is applied in serial signals through a serial data bus 201b to the serial I/O unit 201c of the CPU 201. The lens data is transferred to the camera body 101 by electric contacts provided near a lens mount when the interchangeable lens 102 is mounted on the camera body 101.

The CPU 201 has data buses and input and output terminals P1 to P21. The focus detecting unit 202 comprises a linear self-scanning image sensing element CCD, a CCD driver, an A/D converter and a reference voltage source for A/D conversion. Image signals obtained by the CCD are given through an automatic focusing data bus (hereinafter referred to as "AF data bus") 201a to the CPU 201. The display unit 203 displays information provided by the CPU 201 including the results of calculation for automatic exposure, such as shutter speed Tv and an diaphragm aperture value Av, focusing condition (in-focus/out-of-focus) or a photographing mode. The photometric unit 205 for measuring the brightness Bv of an object comprises a photoelectric element for receiving light, an A/D converter, a reference voltage source for A/D conversion, and a data I/O circuit connected to the CPU 201. The photometric unit 205 measures light transmitted through the photographic lens upon the reception of a light measurement instruction from the CPU 201. The film sensitivity read unit 206 reads the film sensitivity of the loaded film indicated on the film cartridge through electric contacts provided in a film chamber (not shown) of the camera body 101. The driver controller 207 is controlled by signals given thereto from the CPU 201 through control signal lines CMD0 to CMD8 connected to the output terminals P8 to P16 of the CPU 201, respectively. Each of the switches SW1 to SW3 and SW5 to SW10 has its one end connected to the ground. The other end of respective switches is connected to the input terminals P1 to P7, P20 and P21 of the CPU 201, respectively. The switch SW1 is closed upon the start of a film winding-up operation and is opened upon the completion of the film winding-up operation. The switch SW2 is closed upon the lift-up operation of the mirror 103 and is opened upon the completion of cooking the shutter mechanism. The switch SW3 repeats alternate closing and opening operations several times during the film winding-up operation by one frame. When a shutter release button, not shown, is pressed to a first position, the switch SW5 is closed, and then the CPU 201 provides a signal to start a photometric operation and a focus detecting operation. While the switch SW5 is closed, the lens 102 is driven for focusing when the lens 102 is at an out-of-focus condition. When the lens 102 is brought into an in-focus position, the lens driving operation is stopped. If the shutter release button is released to open the switch SW5 before the lens 102 is brought into an in-focus position, the focusing operation is interrupted. The switch SW6 is a shutter release switch which is closed when the shutter release button is pressed further to a second position. When the switch SW6 is closed during the camera being set ready for a photographic operation, the CPU 201 provides a signal to start a shutter release operation. The switch SW5 is held closed while the shutter release switch SW6 is closed. The switch SW7 is disposed in a film passage to detect a film. The switch SW7 is opened while at least a part of a film is at a position corresponding to the switch SW7 on the film passage and is closed when no part of the film is at the position corresponding to the switch SW7. When the film is almost rewound to remain the leading end of the film slightly from the film cartridge, the switch SW7 changes from an OFF state into an ON state. Accordingly, the switch SW7 is a film cartridge detecting switch disposed near the electric contacts of the film sensitivity read unit 206 provided in the film chamber of the camera body 101. The switch SW8 is closed when a film cartridge is placed in the film chamber and a back lid of the camera body 101 is closed. When the film chamber is empty, the switch SW8 is opened. The switch SW9 is a back lid detecting switch which is closed when the lid is closed perfectly. The switch SW10 is a multiple exposure mode selector switch which is closed to select a multiple exposure mode.

The reset terminal RESET of the CPU 201 is pulled up to a power supply voltage $+V_{DD}$ by a resistor R1. The CPU 201 is reset after the same has been connected to a power supply thereto in response to a level change of a capacitor $C_1$ from "LOW" to "HIGH" charged through the resistor R1. A quartz oscillator X is connected to the CPU 201 to apply clock signals to the CPU 201.

The driver controller 207 and other controllers will be described hereinafter. A magnet 1CMg is energized to hold a preceding shutter curtain when a control signal output line 1CMGO becomes "LOW". A magnet 2CMg is energized to hold a trailing shutter curtain when a control signal output line 2CMGO becomes "LOW". A time interval between the release of the preceding shutter curtain and the release of the trailing shutter curtain corresponds to a shutter speed. A magnet FMg holds a diaphragm stopping member for stopping the diagram of the photographic lens 102. When a control signal output line FMGO becomes "LOW", the magnet FMg is energized to hold a diaphragm stopping member (not shown). When released, the diaphragm stopping member stops the diaphragm at a desired opening. A magnet RMg controls a shutter release member. When a control signal output line RMGO is maintained "LOW" for a predetermined time, shutter release member is released, the opening of the diaphragm is reduced and the mirrors 103 and 104 are lifted up.

Driving transistors Q1 to Q10 are provided in a driving circuit for driving the sequence motor $M_1$ and the AF motor $M_2$. The sequence motor $M_1$ is provided with two coils respectively for a high-torque low-speed operating mode and a low-torque high-speed operating mode. The operating mode of the sequence motor $M_1$ can be changed between the two operating modes. The transistors Q1 to Q6 are connected to enable both the normal and reverse rotation of the sequence motor $M_1$ in both operating modes. The high-speed operation terminal H, the low-speed operation terminal L and the common terminal C of the sequence motor $M_1$ are connected respectively to the junction of the transistors Q1 and Q2, the junction of the transistors Q3 and Q4, and the junction of the transistors Q5 and Q6. Tabulated in Table 1 is the condition of the transistors Q1 to Q6 and the corresponding mode of operation of the sequence motor $M_1$.

TABLE 1

| Q1 | Q2 | Q3 | Q4 | Q5 | Q6 | Operating mode of $M_1$ |
|---|---|---|---|---|---|---|
| OFF | OFF | OFF | ON | ON | OFF | Low-speed, Normal |
| OFF | OFF | ON | OFF | OFF | ON | Low-speed, Reverse |
| OFF | ON | OFF | OFF | ON | OFF | High-speed, Normal |
| ON | OFF | OFF | OFF | OFF | ON | High-speed, Reverse |
| OFF | OFF | OFF | OFF | OFF | OFF | Stop |
| OFF | OFF | ON | OFF | ON | OFF | Low-speed brake |
| ON | OFF | OFF | OFF | ON | OFF | High-speed brake |

In this embodiment, a high-speed brake is not used and only the low-speed brake SBR is used. In the following description, the low-speed brake is referred to simply as "brake".

Driving transistors Q7 to Q10 are provided in a driving circuit for driving the AF motor $M_2$. The driving transistors Q7 to Q10 are connected to form a bridge circuit for driving the AF motor $M_2$ for the normal rotation and the reverse rotation. When the AF motor $M_2$ is driven for the normal rotation, the photographic lens is moved forward. When the AF motor $M_2$ is driven for the reverse rotation, the photographic lens 102 is moved rearward. Switching signals are given through the control signal output lines OM1 to OM10 to the transistors Q1 to Q10, respectively.

An diaphragm aperture encoder 211 and an AF encoder 212 comprise photointerrupters, respectively, and are connected to the driver controller 207 by input signal lines PT1 and PT2, respectively. The diaphragm aperture encoder 211 comprises a light emitting diode 211a and a phototransistor 211b. The diaphragm aperture encoder 211 monitors the stroke of an diaphragm aperture preset lever to determine an opening of the diaphragm; that is, the diaphragm aperture encoder 211 detects an opening of the diaphragm when the shutter release switch is closed. When the shutter release is actuated, the light emitting diode 211a emits light, the phototransistor 211b detects the light emitted by the light emitting diode 211a and interrupted each time the diaphragm aperture preset lever moves a unit length, and then the phototransistor 211b gives a detection signal through the input signal line PT1 to the driver controller 207 each time the diaphragm aperture preset lever moves a unit length. The driver controller 207 generates a pulse signal by shaping the waveform of the input detection signal and applies the pulse signal through an output signal line FP to the input terminal P18 of the CPU 201.

The AF encoder 212 comprises a light emitting diode 212a and a phototransistor 212b. The AF encoder 212 monitors the number of rotation of the AF motor $M_2$ and hence the movement of a focusing lens (not shown) for driving the photographic lens for automatic focusing. Upon the detection of light emitted by the light emitting diode 212a and interrupted each time the AF motor $M_2$ rotates a unit angle, the phototransistor 212b gives a detection signal through an input signal line PT2 to the driver controller 207. The driver controller 207 generates a pulse signal by shaping the waveform of the detection signal representing the movement of the focusing lens of the photographic lens 102 and applies the pulse signal through an output signal line AFP to the input terminal P19 of the CPU 201. In this specification, an output signal and an output signal line for transmitting the output signal are denoted by the same designation. The output signal line AFP is connected also to the internal counter 201d of the CPU 201 to monitor the present photographing position of the photographic lens 102. The counter 201d is cleared when the photographic lens 102 is set in an infinite photographing position, counts up when the photographic lens 102 is driven toward a closest photographing position, and counts down when the photographic lens 102 is driven toward the infinite photographing position. Thus, a position of the photographic lens 102 from the infinite photographing position is indicated by the number of pulses. The output signal line AFP is connected further to the interrupt terminal, not shown, of the CPU 201. The CPU 201 generates an interrupt signal at the trailing edge of a pulse of the AFP signal.

The CPU is provided internally with a timer 201e and counts time by counting internal clock signals. The CPU 201 is provided internally with an EEPROM 201f capable of electrical writing and reading and capable of holding stored data even if a power supply is disconnected therefrom. The CPU 201 is provided with an interrupt timer, not shown, which generates a timer interrupt signal after a set time has elapsed.

Tabulated in Tables 2 and 3 are the condition of control signals provided by the CPU 201 and the driver controller 207 and the corresponding operating modes of the sequence motor $M_1$ and the AF motor $M_2$, respectively, in which "H" indicates "HIGH" and "L" indicates "LOW".

TABLE 2

| CPU | | | Driver Controller | | | | | | Operating mode of |
|---|---|---|---|---|---|---|---|---|---|
| CMD4 | CMD5 | CMD6 | OM1 | OM2 | OM3 | OM4 | OM5 | OM6 | sequence motor $M_1$ |
| H | L | L | L | H | L | L | H | H | Low-speed, Normal |
| L | H | L | L | H | H | H | L | L | Low-speed, Reverse |
| H | L | H | L | L | L | H | H | H | High-speed, Normal |
| L | H | H | H | H | L | H | L | L | High-speed, Reverse |
| H | H | H | L | H | L | H | L | H | Stop |
| L | L | L | L | H | H | H | H | H | Low-speed brake |
| L | L | H | H | H | L | H | H | H | High-speed brake |

TABLE 3

| CPU | | Driver controller | | | | Operating mode |
|---|---|---|---|---|---|---|
| CMD7 | CMD8 | OM7 | OM8 | OM9 | OM10 | of AF motor $M_2$ |
| L | H | L | L | H | H | Normal |
| H | L | H | H | L | L | Reverse |
| H | H | L | H | L | H | Stop |

TABLE 3-continued

| CPU | | Driver controller | | | | Operating mode |
|---|---|---|---|---|---|---|
| CMD7 | CMD8 | OM7 | OM8 | OM9 | OM10 | of AF motor $M_2$ |
| L | L | H | H | H | H | Brake |

The CPU 201 gives control signals CMD0 to CMD8 through the output terminals P8 to P16 to the driver controller 207 to control the same. A control signal RMG0 for controlling the magnet RMg and a control signal FMG0 for controlling the magnet FMg are controlled by the control signals CMD0 and CMD1, respectively. A control signal 1CMg for controlling the magnet 1CMg, and a control signal 2CMG0 for controlling the magnet 2CMg are controlled by the control signals CMD2 and CMD3 respectively. Control signals OM1 to OM6 for controlling the sequence motor $M_1$ are controlled by control signals CMD4 to CMD6. Control signals OM7 to OM10 for controlling the AF motor $M_2$ are controlled by control signals CMD7 and CMD8.

A magnet AMg for cancelling holding the film stationary by releasing a film engagement mechanism (not shown) is connected through a transistor Q11 and a resistor R2 to the output terminal P17 of the CPU 201. The junction of the transistor Q11 and the resistor R2 is grounded through a resistor R3. Normally, the output terminal P17 of the CPU 201 is at "LOW" level and the transistor Q11 is OFF, and hence the magnet AMg is not energized and an element to be attracted is held on the magnet AMg. When the output terminal P17 of the CPU 201 goes "HIGH" to disengage a winding stopper and a winding stopper lever, the magnet AMg is energized to cancel the attraction of the same.

Figure 4:
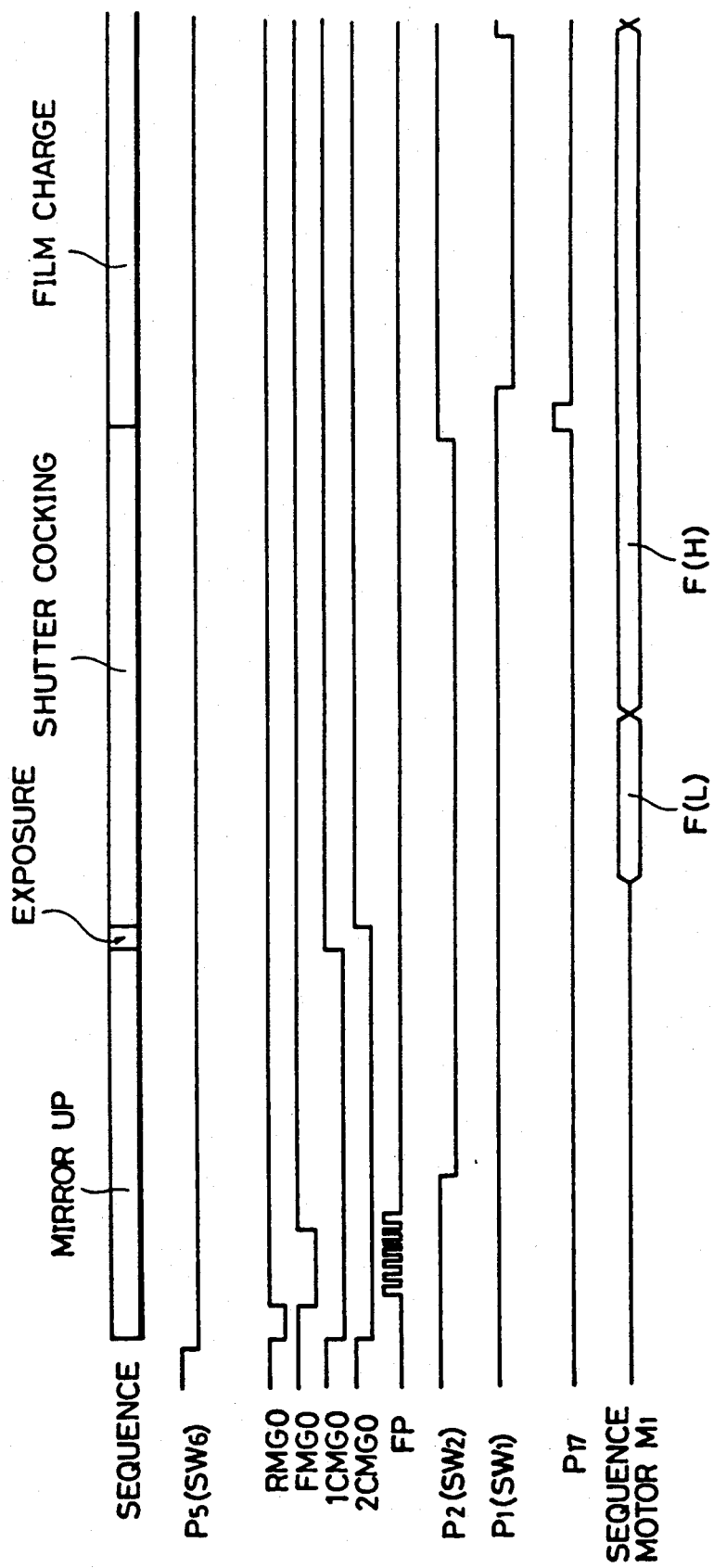
FIGS. 4 and 5 are time charts explaining the operation of the camera of FIG. 1.

Sequential steps of a shutter release operation of the embodiment will be described hereinafter with reference to FIG. 4. The shutter release operation comprises four sequential steps, namely, a mirror lifting step, an exposure step, a shutter mechanism cocking step # and a film winding-up step.

In the mirror lifting step, the main mirror 103 and the submirror 104 are retracted and the diaphragm aperture of the photographic lens 102 is stopped down. In the exposure step, the preceding and trailing shutter curtains of a focal-plane shutter are controlled so as to control an exposure period (shutter speed). In the shutter mechanism cocking step, the main mirror 103, the submirror 104, the diaphragm aperture of the photographic lens 102, and the preceding and trailing shutter curtains are biased by springs for the next shutter release operation. In the film winding-up step, the film is wound-up to bring the next frame to the exposure position.

The sequential steps of the shutter release operation will be described in detail with reference to a time chart shown in FIG. 4.

When the shutter release button is pressed to the second position, the switch SW6 is closed to start the shutter release operation. Then, the output control signal RMG0 goes "LOW" and consequently, the release magnet RMg is energized, so that the main mirror 103 is retracted together with the submirror 104 by the spring to a position near the finder. Then, the output control signal FMG0 goes "LOW" to energize the magnet FMg to start a stopping down operation of the diaphragm biased by the spring. As mentioned in the previous description given with reference to FIG. 3, the monitoring phototransistor 211b gives a signal representing the stopping down condition of the diaphragm to the driver controller 207, and then the driver controller 207 gives an FP signal produced by shaping the waveform of the signal given thereto by the phototransistor 211b to the CPU 201. Upon counting pulses of the FP signal corresponding to the diaphragm aperture value and, the CPU 201 makes the output control signal FMG0 "HIGH" to stop the stopping down operation of the diaphragm, so that the diaphragm of the photographic lens 102 is set at a desired diaphragm aperture value.

Then, the output control signal 1CMG0, which is "LOW" at the start of the shutter release operation, goes "HIGH" to start the exposure operation. Then, the preceding shutter curtain starts traveling. After a predetermined time interval determined by the exposure calculation, from the start of the preceding shutter curtain, the output control signal 2CMG0, which is "LOW" at the start of the shutter release operation, goes "HIGH" to start the trailing shutter curtain to terminate exposure.

After the completion of the exposure operation, the shutter mechanism cocking step is started. In the shutter mechanism cocking step, first the sequence motor $M_1$ is driven in a low-speed mode F (L), because the sequence motor $M_1$ is required to generate a comparatively large torque at the start. The operating mode of the sequence motor $M_1$ is changed from the low-speed mode F(L) to a high-speed mode F(H), i.e., a low-torque high-speed mode, upon the arrival of the operating speed of the sequence motor $M_1$ at a predetermined value. Thus, the sequence motor $M_1$ is driven efficiently and the shutter mechanism cocking operation and the film winding-up operation are carried out rapidly.

The main mirror 103 and the submirror 104 are placed at the lower position and are biased by the spring when the sequence motor $M_1$ is operated. At the same time, the diaphragm aperture of the photographic lens 102 and the preceding and trailing shutter curtains of the focal plane shutter are biased by the spring. As mentioned above, upon the completion of the shutter mechanism cocking operation, the switch SW2 is opened to provide a shutter mechanism cocking operation completion signal. Upon the detection of the opening of the switch SW2, the CPU 201 starts a film winding routine. In the routine, the film restrain member (not shown) is released to start the film winding-up operation and the switch SW1 for monitoring the film winding-up operation is closed to maintain the operation of the sequence motor $M_1$. Upon the completion of winding-up the film by one frame, the switch SW1 goes OFF to inform the CPU 201 of the completion of the film winding-up operation. When the CPU 201 detects switch SW1 being OFF, it applies a brake to stop the sequence motor $M_1$. Thus, all the steps of the shutter release operation for one frame of the film are completed.

Figure 5:
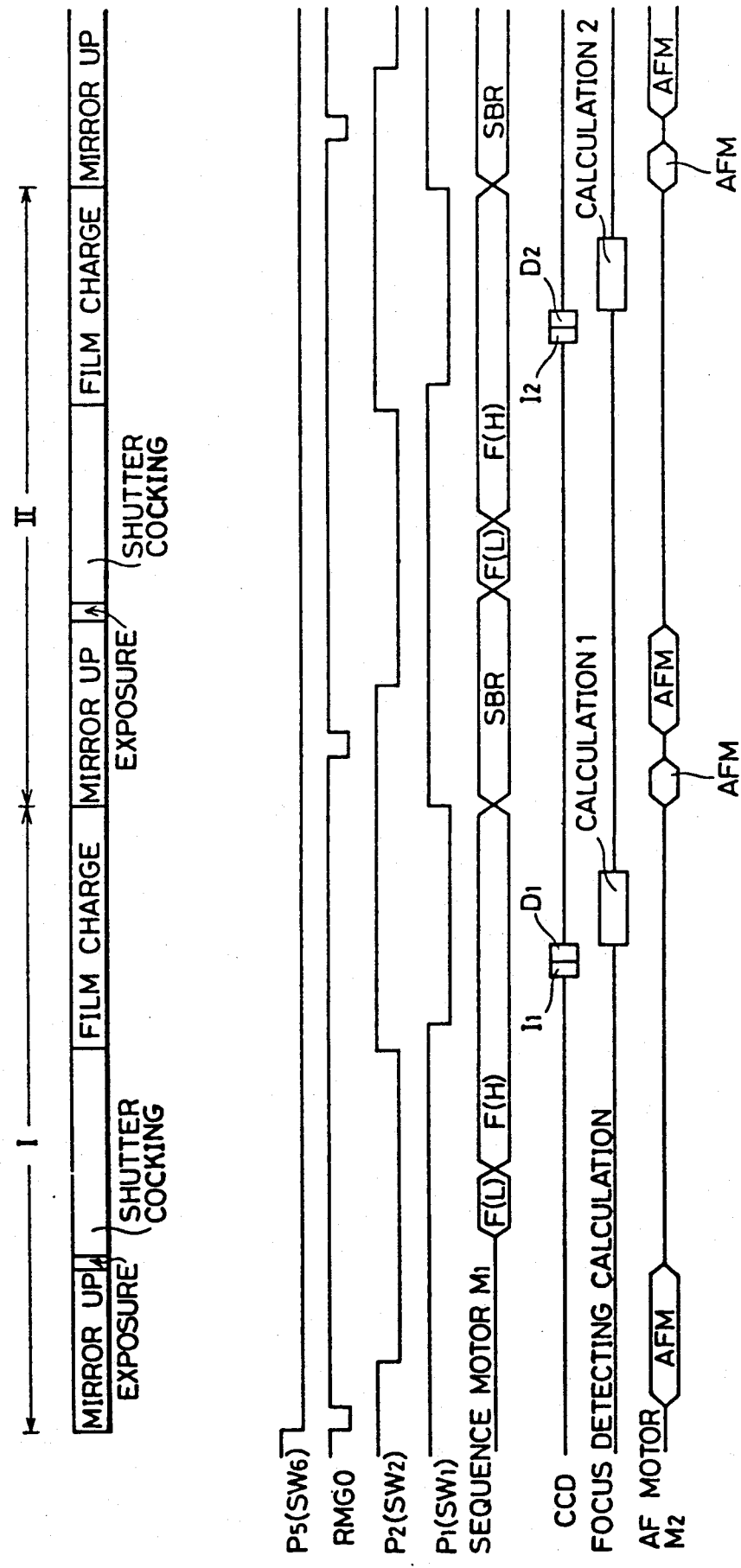

Sequential steps of a continuous photographing operation, in which the switch SW6 remains closed, including a focus detecting operation will be described hereinafter with reference to a time chart shown in FIG. 5. In FIG. 5, periods I and II are for the first and second frames of a film, respectively, in a continuous photographing mode. The operation in the period I for the first frame is the same as described with reference to FIG. 4. The main mirror 103 and the submirror 104 must be stabilized at the lower position for focus detection. To satisfy the requirement, charge accumulation is started after the switch SW2 has been opened and a predetermined lapse of time has passed since the shutter mechanism cocking operation is completed. (in this embodiment, 30 msec). In FIG. 5, indicated at $I_1$ is a time interval for charge accumulation, and at $D_1$ is a time interval corresponding to a data dump time for the A/D conversion of the pixel data of CCD and storing the converted data in the memory of the CPU 201. Then, the amount of defocus, the direction of defocus and the reliability of focus detection are determined by the predetermined calculation. The focus detecting operation is not directly related with the present invention and hence the description thereof will be omitted.

Upon the completion of the first film winding-up operation the switch SW1 is opened to apply the low-speed brake SBR to the sequence motor $M_1$. At this moment the CPU 201 decides whether or not the switch SW6 is closed. When the switch SW6 is closed and the continuous photographing mode is selected, the second shutter release operation in the second period II for the second frame is started. In the second shutter release operation, the shutter is released immediately after winding-up the film. Therefore, CPU waits for a predetermined lapse of time with low-speed brake SBR applied to the sequence motor $M_1$ to enable the film to stop securely, while the release magnet RMg is energized. When the results of a focus detecting calculation 1 indicate that the photographic lens 102 is at an in-focus position, an in-focus photograph can be taken even if the second shutter release operation is started with the photographic lens 102 stopped. However, the photograph of the second frame will be out-of-focus if the second shutter release operation is carried out without readjusting the photographic lens, when the photographic lens is at an out-of-focus position. In most cases in the continuous photographing mode, in particular, the object is moving and the defocus amount differs depending on time. Accordingly, the amount of defocus resulting from the movement of the object is detected by the calculation 1. The photographic lens 102 is driven during the mirror lifting operation to shift the photographic lens 102 by a distance corresponding to the amount of defocus calculated through the calculation 1, so that an in-focus photograph can be taken by the second shutter release operation. AF motor $M_2$ in FIG. 5 represents the driving condition of the photographic lens by AF motor $M_2$. A single line represents that the motor $M_2$ is OFF and a dual time represents that the AF motor $M_2$ is in operation for focus adjustment to rotate either direction indicated by the calculation 1. The photographic lens is further driven during mirrors 103 and 104 being lifted up for the next period II to correct the defocus detected by the calculation 1. When the output control signal RMGO is "LOW", namely, when the release magnet RMg is energized, power is not supplied to the AF motor $M_2$ to avoid the deterioration of accuracy of driving the AF motor $M_2$ or to avoid failure in releasing the main mirror 103 for upward movement due to reduction of the current supplied to the release magnet RMg, because the current supplied to the release magnet RMg is large and hence the current is reduced if the AF motor $M_2$ is driven while the release magnet RMg is energized. Thereafter, the shutter release operation is repeated continuously while the switch SW6 is closed.

The operation of the embodiment will be described hereinafter with reference to flow charts shown in FIGS. 6 to 13.

Figure 6A:
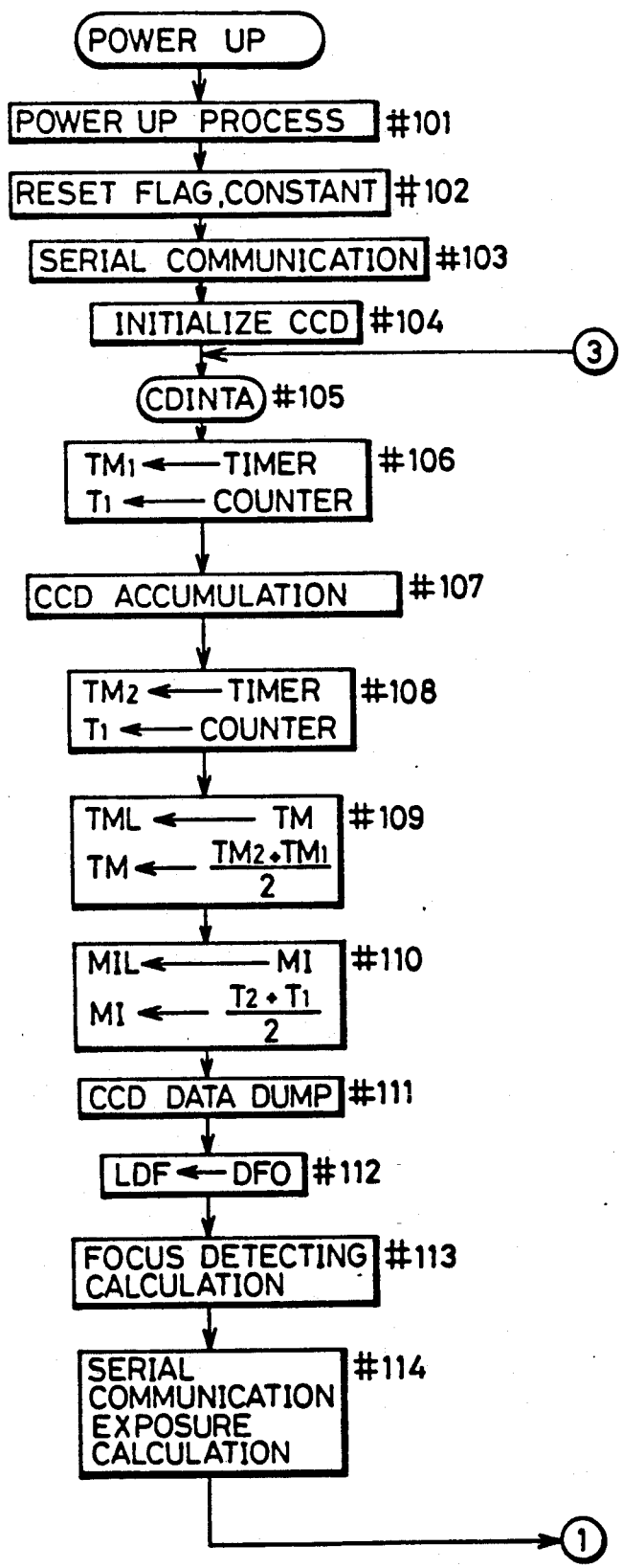
FIGS. 6A to 13 are flow charts explaining the operation of the camera of FIG. 1.
Figure 6B:
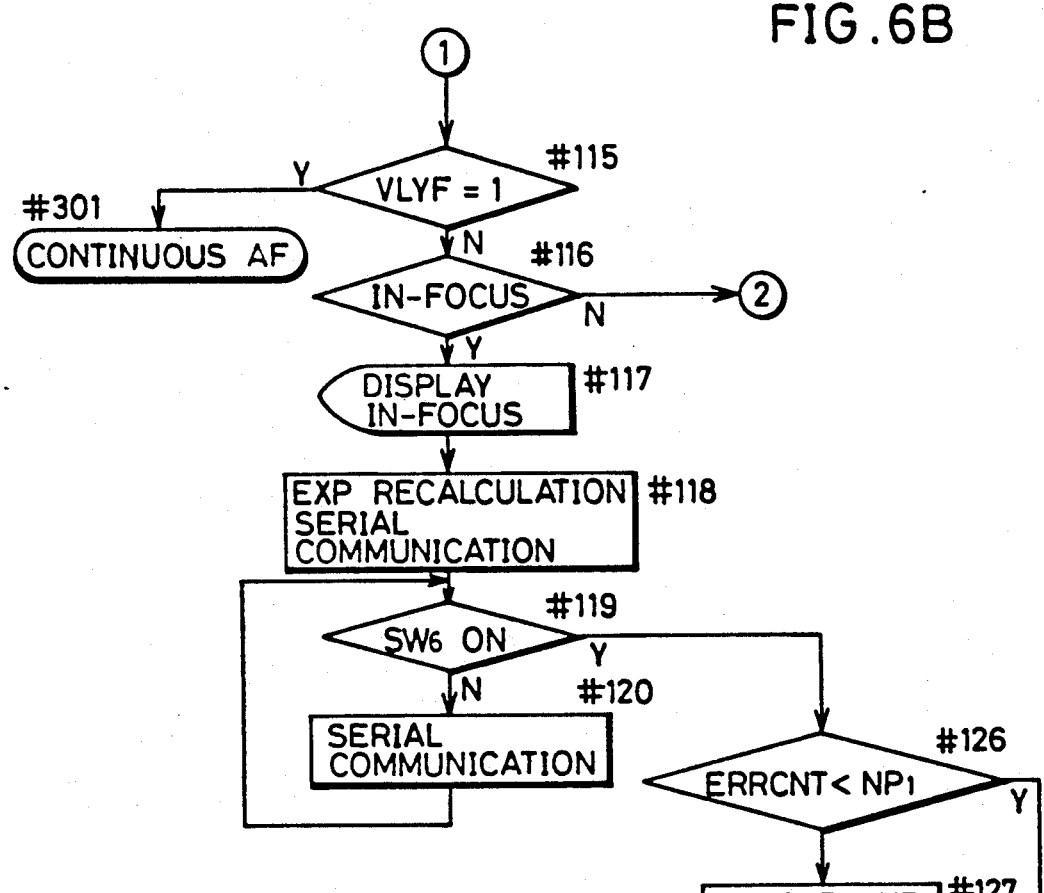
Figure 6C:
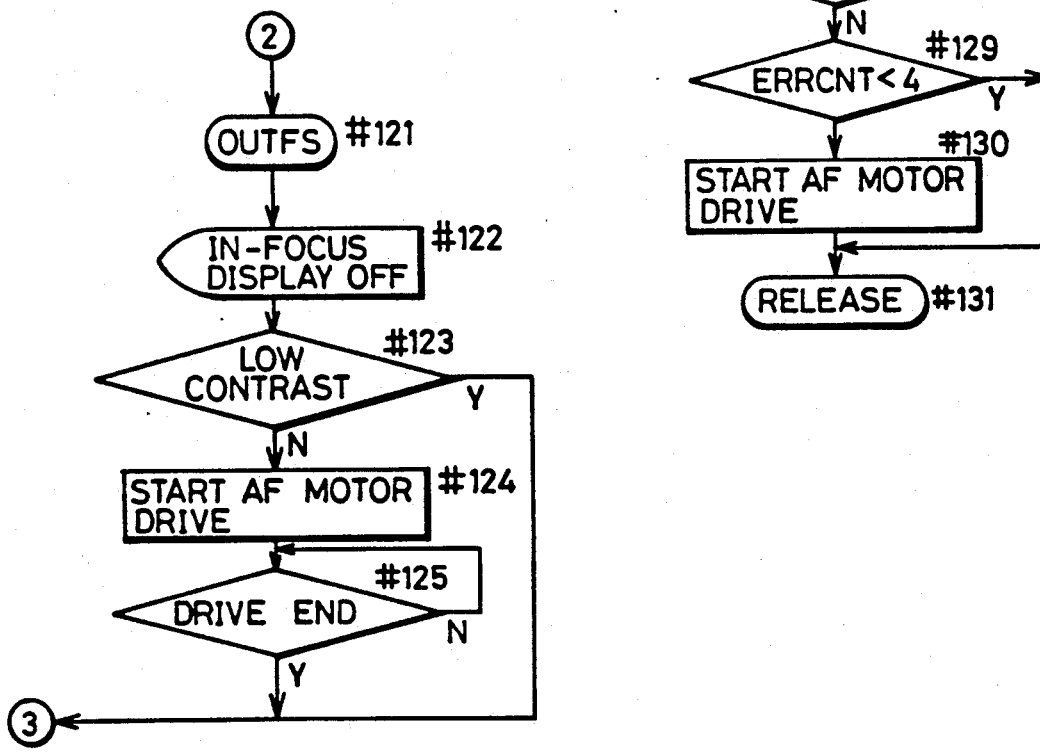

A control program shown in FIG. 6 is executed when the switch SW5 for starting the photometric operation is closed. When the switch SW5 is opened, the camera is in a low power consumption mode i.e., a so-called sleep mode. The switch SW5 is closed to actuate the camera and to start the clock oscillation. Then, in step #101, the CPU 201 executes a starting procedure to give a start signal and clock signals to the peripheral ICs and to initialize the I/O ports. In step #102, flags and constants used in the control program are initialized. In step #103, the CPU 201 checks the switches provided on the camera body 101, and carries out serial communication to and from an electronic flash circuit (not shown), the photographic lens 102 and the display 203. In step #104, unnecessary charges in the CCD are discharged for initialization.

Then, the program goes to step #105 to execute a focus detecting routine CDINTA. Prior to charge accumulation in the CCD, the timer 201e writes charge accumulation start time in a memory TM1 of the CPU 201 in step #106. Then, the counter value of the counter 201d indicating the present photographing position of the photographic lens 102 described above is read and stored in a memory T1. In step #107, charge is accumulated in the CCD to a level appropriate for focus detection. Upon the completion of charge accumulation in step #107, a time measured by the timer 201e is stored in a memory TM2 and the counter value of the counter 201d is stored in a memory T2 in step #108. Then, in step #109, the contents of a memory TM is stored in a memory TML, and (TM2-TM1)/2 is stored in the memory TM. TM1 is charge accumulation start time, TM2 is charge accumulation end time and hence (TM2-TM1)/2 is the central time of charge accumulation period (hereinafter, referred to as "accumulation central time"). That is, the accumulation central time in the preceding charge accumulation cycle is stored in the memory TML, and the present accumulation central time is stored in the memory TM in step #109. Similarly, the count stored in a memory MI is stored in a memory MIL and (T2-T1)/2 is stored in the memory MI. Since the count corresponds to the position of the photographic lens as mentioned above, T1 indicates the position of the photographic lens at the start of charge accumulation, T2 indicates the position of the lens at the end of charge accumulation, and (T2-T1)/2 indicates the position of the lens at the accumulation central time. That is, in step #110, the position of the photographic lens at the accumulation central time in the preceding charge accumulation cycle is stored in the memory MIL, and the position of the photographic lens at the present accumulation central time is stored in the memory MI. In step #111, data dump is executed to transfer the pixel data of the CCD to the CPU 201. Then, in step #112, the contents of a memory DF0 is stored in a memory LDF before the CPU 201 starts the focus detecting calculation by using the pixel data. Step #107 for focus detection has not yet been executed by this moment. Accordingly, in step #112, the amount of defocus DF0 determined in the preceding focus detecting calculation is stored in the memory LFD. In step #113, the focus detecting calculation is executed on the basis of the pixel data provided by the CCD in step #107 to determine the amount of defocus of the photographic lens, the direction of defocus and the reliability of focus detection. Subsequently, in step #114, serial communication and exposure calculation are executed to display the result of photometric measurement and to check the condition of the switches. For example, when the switch SW5 is opened in steps #107 to #114, the opening of the switch SW5 is detected in step #114, and then, the display is cancelled and the motors are stopped to set the camera in the sleep mode. Upon the completion of the serial communication and the exposure calculation, a flag VLYF is examined in step #115 to see if the camera is in the continuous photographing mode. When the continuous photographing mode is selected during the film winding-up operation, the flag VLFY is set to "1". When VLFY=1, the control program branches off to a continuous photographing AF routine (step #301), which will be described afterward with reference to FIG. 9.

When the flag VLFY=0, step #116 is executed to see if the photographic lens 102 is in the in-focus state. It is decided that the photographic lens is in-focus when the reliability of focus detection determined in step #113 is higher than a predetermined value and the amount of defocus DF0 is less than a predetermined limit value of defocus (in this embodiment, 100 μm), which may be stored beforehand in the EEPROM 201f of the CPU 201. The limit value of defocus may be decided taking into consideration the diaphragm aperture value of the photographic lens and the corresponding depth of focus by using:

$$60\ \mu m + 8 \times (2 \log_2 F_{No} + 1)$$

where $F_{No}$ is an diaphragm aperture value expressed by an F number. A comparatively small limit value of defocus is selected for focusing at a high accuracy, and comparatively large limit value of defocus is selected for rapid focusing. Thus, the limit value of defocus may be determined according to the needs of the user.

When a decision is made in step #116 that the photographic lens is in in-focus, an in-focus state is indicated in step #117. Subsequently, the exposure calculation is executed again and the serial communication is performed to reflect the results of focus detection on the exposure calculation. In step #119, a query is made to see if the switch SW6 is closed. The serial communication is repeated in step #120 until the response in step #119 becomes affirmative.

When the decision in step #116 is negative, the control program jumps to step #121 to execute an out-of-focus routine OUTFS. In step #122, the in-focus indication is cancelled. In step #123, a query is made to see if the reliability of the results of focus detecting calculation is excessively low and the result of focus detection is unavailable, namely if the contrast of the object is excessively low. When the response in step #123 is affirmative, the control program returns to step #105 to execute the focus detecting routine CDINTA for the next focus detection without driving the AF motor $M_2$. When the response in step #123 is negative, the AF motor $M_2$ is actuated in step #124. When a decision made in step #125 is that the operation of the AF motor $M_2$ has ended, the control program returns to step #105 to execute the focus detecting routine CDINTA for the next focus detection. In step #124, the number of driving pulses ERRCNT by which the AF motor $M_2$ is to be driven is calculated by using a equation: ERRCNT=DF0×KL, where DF0 is the amount of defocus of the photographic lens, and KL is a convergence coefficient peculiar to the photographic lens. In step #125, the AF motor $M_2$ is driven until the coincidence of the number of driving pulses applied to the AF motor $M_2$ with the calculated number of driving pulses ERRCNT is detected by an AFP signal monitoring the operation of the AF motor $M_2$. The convergence coefficient KL is peculiar to the focal length of the photographic lens and is given from the photographic lens to the CPU 201 through the serial communication between the photographic lens and the CPU 201. Then, steps #105 through #116 are repeated until the photographic lens is brought to the in-focus position.

Steps subsequent to the detection of closing of the switch SW6 in step #119 will be described hereinafter. In step #126, a query is made to see if the number of driving pulses ERRCNT is less than a constant NP1 stored in the EEPROM 201f. When the response in step #126 is negative, the constant NP1 is reset as the number of driving pulses ERRCNT in step #127. When the response in step #126 is affirmative, a query is made in step #128 to see if the amount of defocus DF0 determined in step #116 is less than a constant DFC1. When the response in step #128 is affirmative, namely, DF0<DFC1, the control program jumps to step #131 to start the shutter release operation immediately. When the response in step #128 is negative, namely, DF0≧DFC1, a query is made in step #129 to see if the number of driving pulses ERRCNT is less than "4". When the response in step #129 is affirmative, the control program jumps to step #131 to start the shutter release operation immediately. When the response in step #129 is negative, the AF motor $M_2$ is actuated in step #130. In steps #126 through #131, decisions are made to determine whether or not the photographic lens is to be driven while the mirrors are lifted up. As mentioned previously, the detected amount of defocus is compared with a predetermined limit value of defocus in step #116 to determine whether or not the photographic lens is within in-focus. When the limit value of defocus is very small, the decision is made highly accurately, whereas the decision takes much time due to variation in focus detection or camera shake, or undesirable minute oscillation of the photographic lens occurs. The detected amount of defocus varies momentarily in taking a moving object, it is impossible to decide whether or not the photographic lens is in-focus, if the limit value of defocus is excessively small. Accordingly, the limit value of defocus is decided to flexibly cope with the variation in focus detection or variation in the measurement of the amount of defocus due to the movement of the object relative to the camera can be absorbed. However, in this case the limit value of defocus remains as an error in focusing. To correct error, the photographic lens is driven during the upward movement of the mirrors thereby providing an automatic focusing camera with high precision. The number of pulses available during the upward movement of the mirrors is limited to the constant NP1 (steps 126 and 127) to curtail time up to shutter release operation if the focusing accuracy is sufficiently high, namely, when DF0<DFC1 (step #128), or when the number of driving pulses ERRCNT is less than "4" (step #129), the shutter release operation is started immediately taking into consideration the driving accuracy of the AF motor $M_2$.

Figure 7:
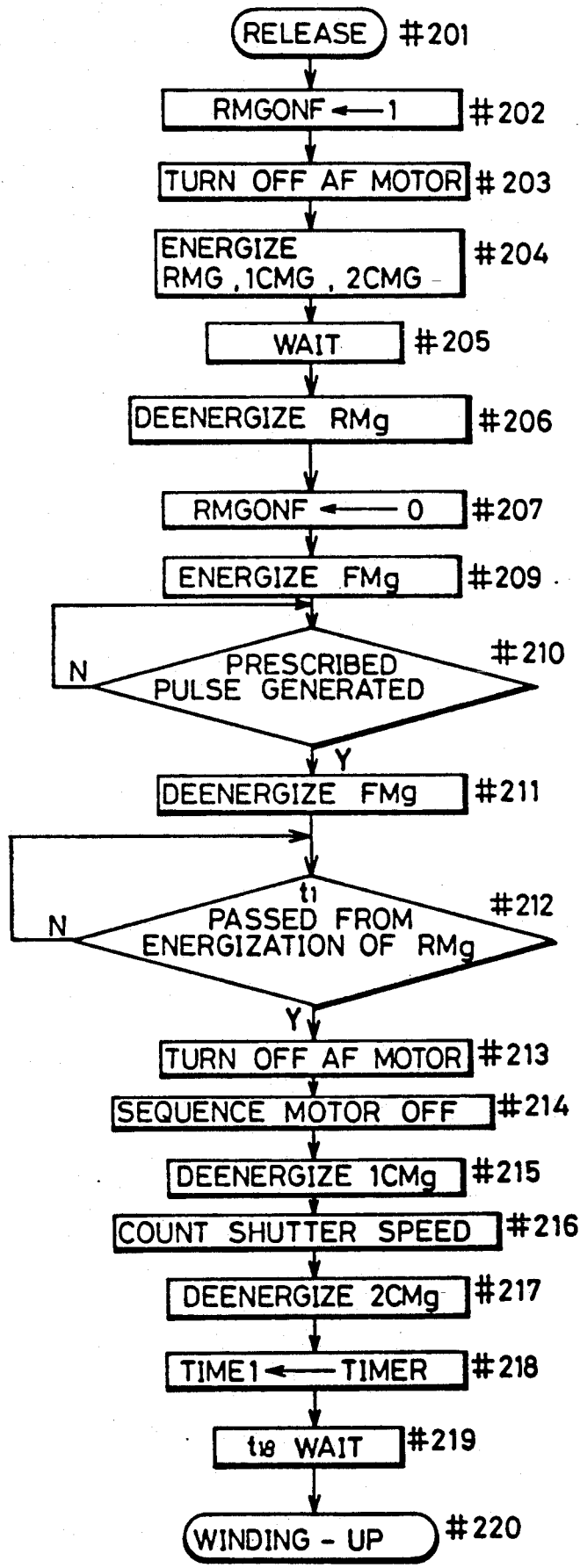

A series of steps of a shutter release operation control routine (step #201 and the following steps) including a mirror lifting operation, an exposure time control operation, a shutter mechanism cocking operation and a film winding-up operation will be described hereinafter with reference to FIG. 7.

A flag RMGONF is set to "1" in step #202 to indicate that the shutter release magnet RMg is being energized, supply of power to the AF motor M2 is interrupted in step #203, and the shutter release magnet RMg, and the shutter curtain holding magnets 1CMg and 2CMg are energized in step #204. After a latency in step #205, the shutter release magnet RMg is de-energized in step #206, and the flag RMGONF is set to "0". In steps #204 through #206, the main mirror 103 and the submirror 104 are released and the mirror lifting operation is started. While power is supplied to the shutter release magnet RMg in steps #202, #203 and #207, power is not supplied to the AF motor M2. More specifically, the AF motor M2 is driven periodically by timer interrupt and the AF motor M2 is braked each time an AFP signal is generated. When the flag RMGONF=1, the actuation and braking of the AF motor M2 is forbidden and the AF motor M2 is kept stopped. When the flag RMGONF is reset, the AF motor M2 is actuated automatically by timer interrupt. The foregoing steps are executed to avoid following possible disadvantage. The shutter release magnet RMg requires a large current for operation. If a current is supplied to the AF motor M2 while the shutter release magnet $RM_g$ needs to be energized, current supplied to the shutter release magnet RMg becomes insufficient, so that the shutter release magnet RMg is unable to release the shutter mechanism and the mirrors cannot be lifted up.

Upon the start of upward movement of the mirrors, the diaphragm stopping magnet FMg is energized in step #209. Consequently, an engagement of diaphragm diaphragm aperture of the photographic lens is released to stop down a diaphragm aperture. In step #210, pulse generated by the diaphragm aperture encoder 211 are counted. When the count of the pulses matches with a pulse count determined by the exposure calculation, the magnet FMg is de-energized to determine an opening of the diaphragm aperture in step #211. Then, in step #212, the shutter release magnet RMg is energized, and after a lapse of the predetermined time $t_1$, step #213 is executed. In step #213, power is not supplied to the AF motor M%2 to prevent driving the photographic lens during exposure, and then the sequence motor $M_1$ is stopped in step #214. As mentioned above, the sequence motor $M_1$ is kept braked after a photographing cycle for the second frame during the continuous photographing operation until step #214 is executed to stop the sequence motor $M_1$. In step #215, the magnet 1CMg restraining the preceding shutter curtain is de-energized to allow the preceding shutter curtain to start travelling. After a latency corresponding to the shutter speed in step #216, the magnet 2CMg for restraining the trailing shutter curtain is de-energized in step #217 to allow the trailing shutter curtain of the focal plane shutter to start travelling. Thus, the exposure operation is completed. In step #218, a time measured by a timer is stored in a memory TIME1. After a latency $t_{18}$ in step #219 to hold the completion of travelling the trailing shutter curtain, a film winding routine (step #220) is executed.

Figure 8:
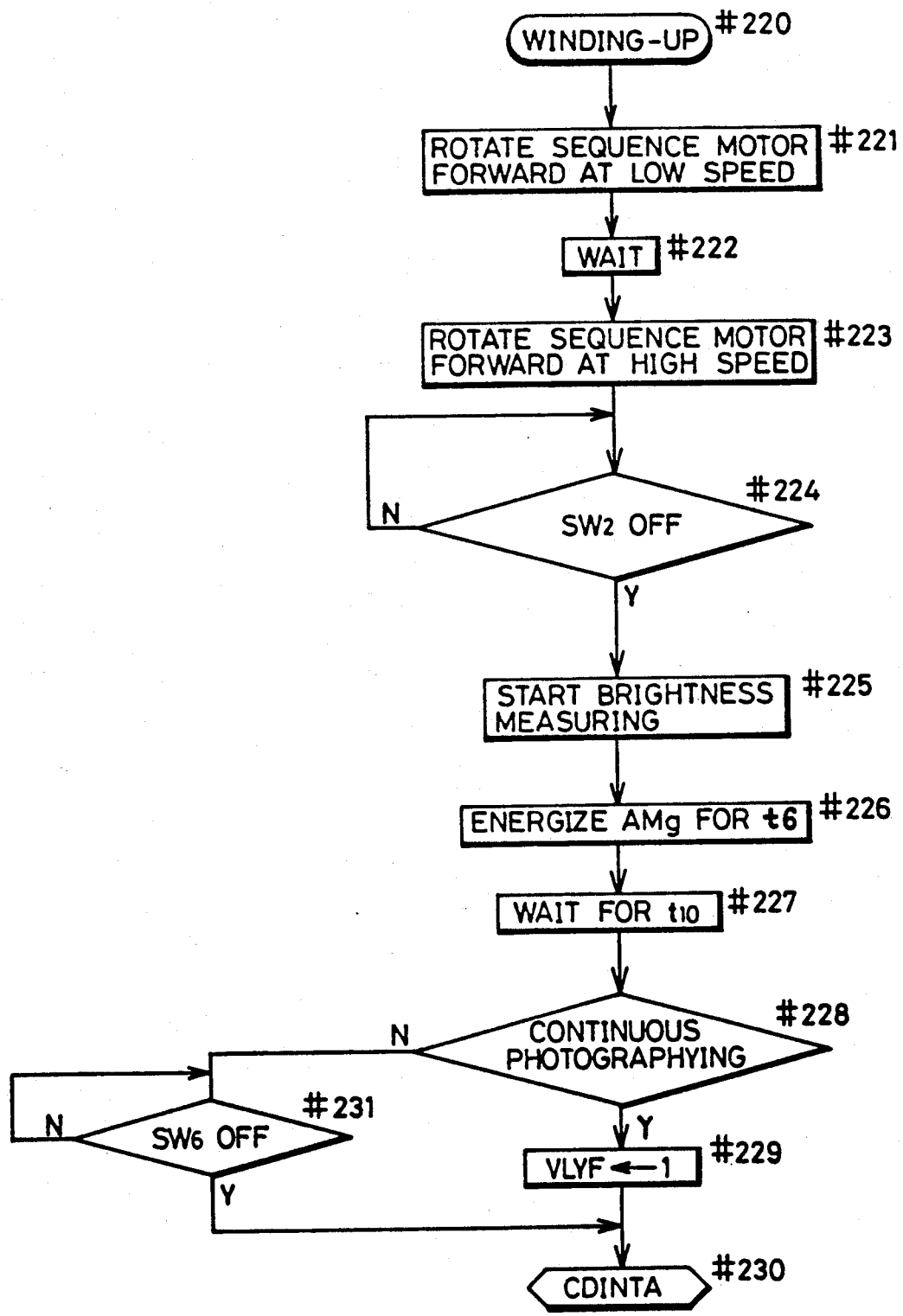

Referring to FIG. 8 showing a film winding routine, the sequence motor $M_1$ is driven in the low-speed mode in step #221. After a predetermined latency for the rotating speed of the sequence motor $M_1$ to increase in step #222, the operating mode of the sequence motor $M_1$ is changed from the low-speed mode to the high-speed mode in step #223 to carry out the shutter mechanism cocking operation until the switch SW2 opens upon the completion of the shutter mechanism cocking operation. When the shutter mechanism cocking operation is completed, TTL photometric measurement becomes possible, since the main mirror 103 and the submirror 104 are placed at the lower operating position. In step #225, the photometric measurement is started. In step #226, the film releasing magnet AMg is energized for a predetermined time $t_6$. Then, the routine is held in step #227 for a predetermined latency $t_{10}$ (in this embodiment, 30 msec) to stabilize the submirror 104. In step #228, a query is made to see if the continuous photographing mode is selected. When the response in step #228 is affirmative, the flag VLYF is set to "1" in step #229 to indicate the selection of the continuous photographing mode, and then the program goes to step #230 to execute the focus detecting routine CDINTA including step #105 and the following steps. When the response in step #228 is negative, the CPU waits until switch SW6 is open in step #231 and the program goes to step #230 to execute the focus detecting routine CDINTA including step #105 and the following steps.

Figure 9A:
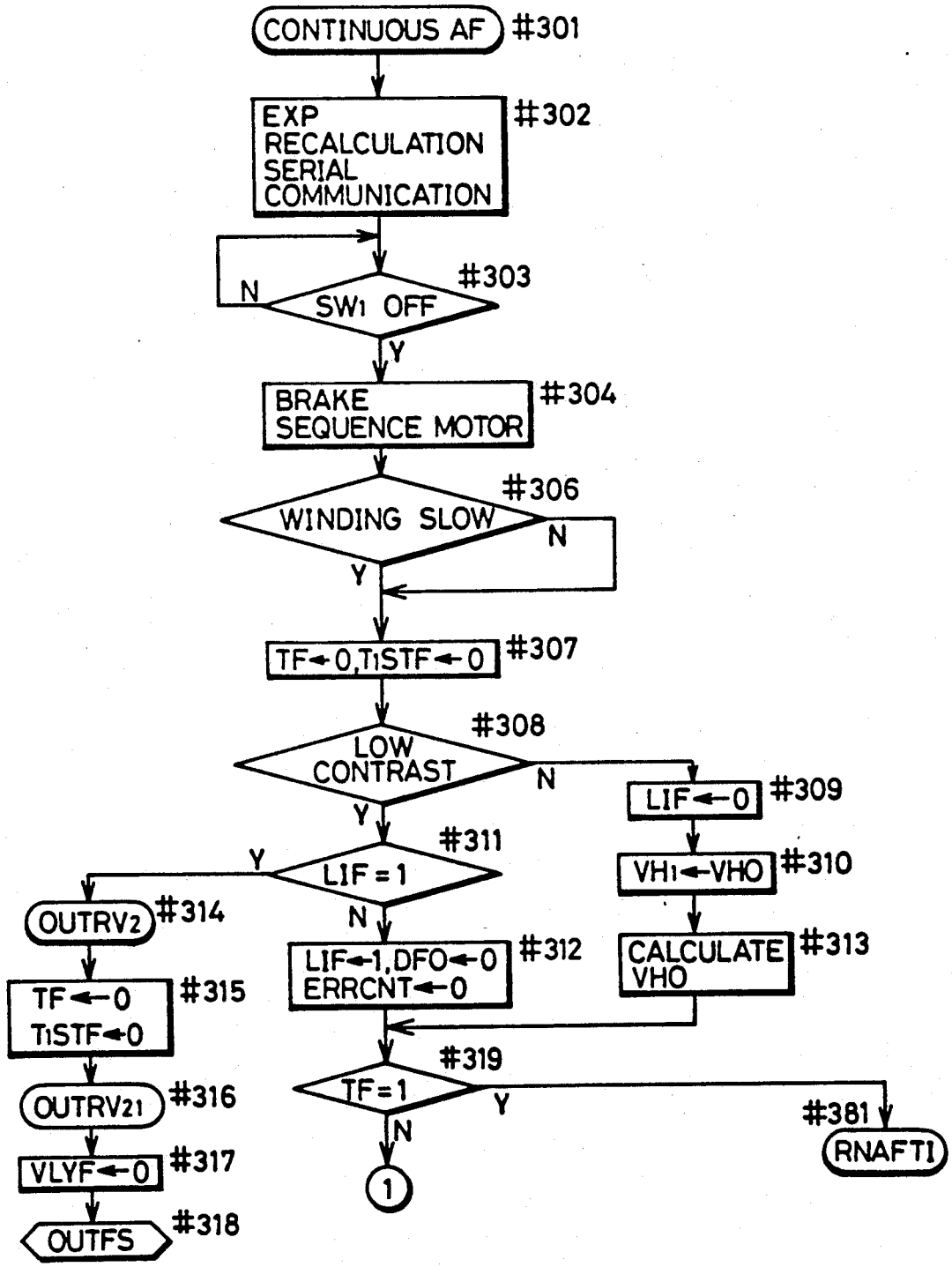
Figure 9B:
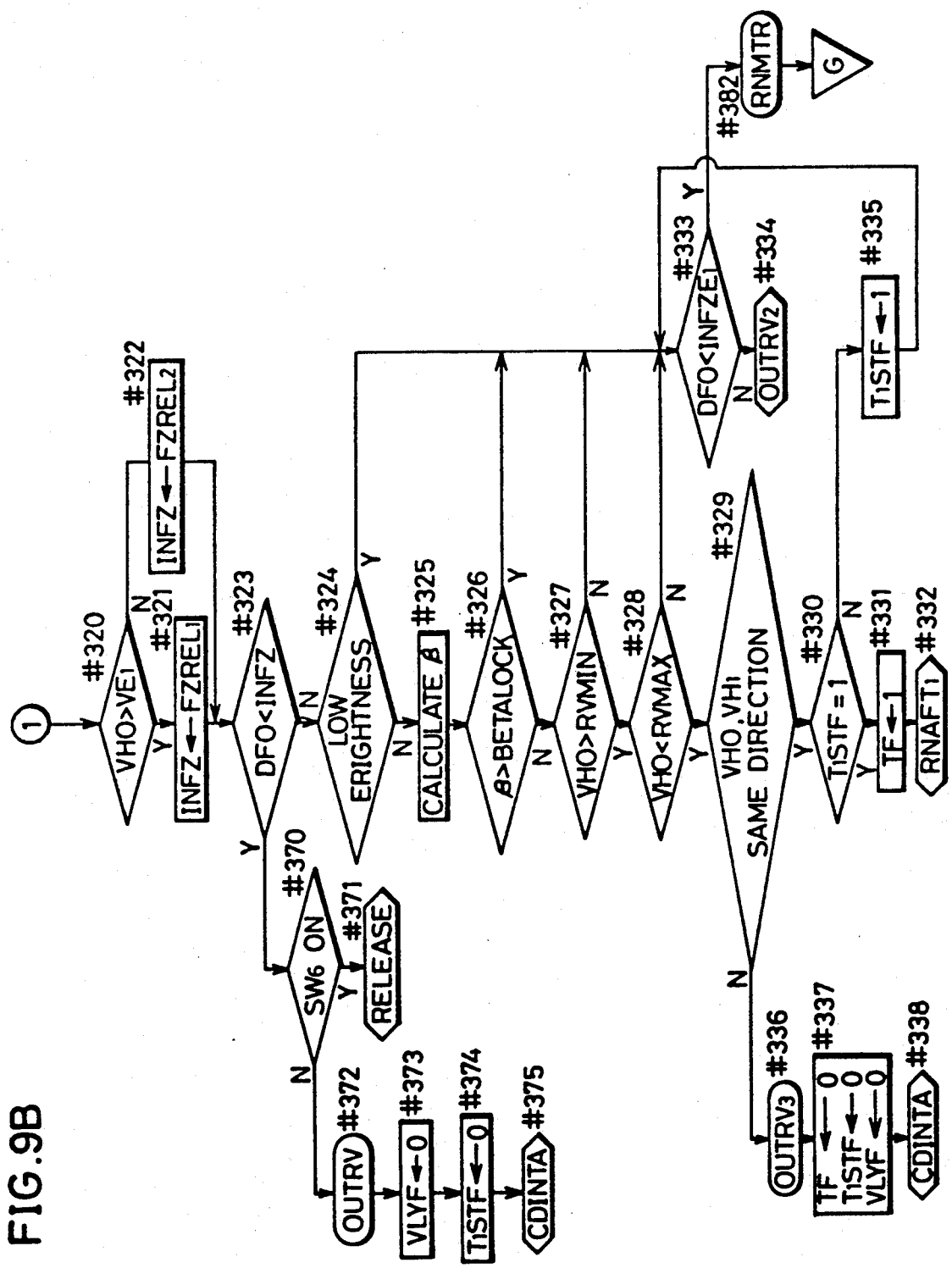

An automatic focusing operation for continuous photographing will be described with reference to FIG. 9.

After the routine has gone from step #230 (FIG. 8) to step #105 to execute the focus detecting routine CDINTA, the focus detecting calculation and the exposure calculation are carried out in steps #105 through #114 in a manner as described to FIG. 6. Then, in step #115, the program branches off to step #301 to execute a continuous photographing AF routine. In step #302, exposure calculation using data obtained by photometric measurement in step #225 and serial communication are executed, and whereby correct exposure can always be achieved regardless of variation in the brightness of the object during the continuous photographing operation. Then, in step #303, a query is made to see if the switch SW1 is open. That is, only a single cycle of focus detecting operation is allowed during the film winding-up operation to give priority to the next shutter release operation in the continuous photographing mode. Upon the detection of the opening of the switch SW1, namely, upon the detection of completion of the film winding-up operation, the sequence motor $M_1$ is braked immediately in step #304. In step #306, a query is made to see if the time spent for the film winding-up operation is longer than a predetermined time. More specifically, time after exposure shown by timer TIME1 is subtracted from the present time and the result is compared with the predetermined time. A time necessary for winding-up the film varies widely depending on the tension of the film, the condition of the power supply or the number of frames. When the response in step #306 is affirmative, a prediction mode flag TF and an initial prediction flag T1STF are reset to "0" in step #307. The prediction mode flag TF is set to set at a prediction mode in which a correction corresponding to the movement of an object is made in taking a moving object. When the response in step #306 is affirmative, namely, when the film winding-up operation required a time longer than the predetermined time, the prediction mode flag TF is reset to "0", because interval between the successive photographing cycle is long and the correction corresponding to the movement of the object includes an error.

In step #308, the result of focus detection is examined to decide if the object is in a low contrast. When the decision in step #308 is negative, the program branches off to step #309 to set a low-contrast ignoring flag LIF to "0". The low-contrast ignoring flag is set to "1" to continue the continuous photographing operation ignoring a low-contrast condition. In step #310, the last defocus speed (the moving speed of the image of moving object on the image surface) VH0 is stored, and then the present defocus speed VH0 is determined in step #313. In step #313, the present defocus speed VH0 is calculated in the following manner. The present amount of defocus DF0 has been obtained through detection and has been stored in a memory before step #313. The last amount of defocus determined by the last focus detection is stored in the memory LDF in step #112 (FIG. 6). The position of the photographic lens at a moment corresponding to the accumulation central time at which the amount of defocus DF0 is determined and stored in the memory MI as is described in #110 in FIG. 6. The position of the photographic lens at a moment corresponding to the accumulation central time at which the previous amount of defocus LDF was determined is stored in the memory MIL. A variation in the amount of defocus δDF caused by the movement of the object is calculated by using an expression:

$$\delta DF = DF0 - LDF + (MI - MIL)/KL \quad (1)$$

where DF0 − LDF is a variation in the amount of defocus, and (MI − MIL)/KL is the amount of defocus attributable to the movement of the focusing lens of the photographic lens in a period Δt between the last accumulation central time and the present accumulation central time described in step #109 in FIG. 6, as $$\Delta t = TM - TML \quad (2)$$

From expressions (1) and (2), the present defocus speed VH0 is determined by:

$$VH0 = \delta DF/\Delta t$$

After the present defocus speed VH0 has thus determined in step #313, the program goes to #319.

On the other hand, when the decision in step #308 is affirmative, that is, the contrast being low, a query is made in step #311 to see whether the low-contrast ignoring flag LIF is "0" or "1". When LIF=0, the low-contrast ignoring flag LIF is set to "1", and the present amount of defocus DF0 and the number of driving pulses ERRCNT are cleared in step #312. When LIF=1 (step #311), the program branches off to a prediction mode cancellation routine OUTRV2 (step #314). In step #315, the prediction mode flag TF and the initial prediction flag T1STF, which will be explained afterward, are set to "0". Then, in step #317, a continuous photographing mode flag VLYF is set to "0", and then the routine jumps from step #318 to step #121 (FIG. 6) to execute the out-of-focus routine OUTFS. Thus, the continuous photographing mode is cancelled through steps #308 to #318 when the results of the two successive focus detecting cycles indicate a low-contrast state. Then, the shutter release operation is prohibited until the photographic lens is brought into in-focus through the control operation according to the control program of FIG. 6.

Thus, the foregoing routine allows the photographing operation once in taking a moving object even if the moving object moves off the focus detecting area or a moving object having a low contrast is in the focus detecting area. Accordingly, the possibility of missing a shutter chance in taking a momentary dramatic scene is reduced remarkably, and a greatly defocused state occurs at a low probability. The effect of the foregoing routines is significant particularly in the continuous photographing mode, because most photographers desire to give priority to the shutter release operation. Furthermore, since the continuous photographing operation is interrupted until the photographic lens is brought into in-focus when both the results of the two successive detecting cycles indicate a low-contrast state, the shutter release operation is never repeated continuously with the photographic lens defocused greatly. Accordingly, the film will not be wasted even if the shutter release button is pressed accidentally or even if the photographic lens is covered with the hand.

In step #312, the amount of defocus DF0 and the number of driving pulses ERRCNT are set at "0" because the amount of defocus DF0 and the number of ERRNCT are indefinite since the object is in a low-contrast state. Since the defocus speed VH0 is unable to be calculated, the last defocus speed VH0 is used without changing. In step #319, a query is made to see if the prediction mode is selected. When the response in step #319 is negative, namely, when the prediction mode flag TF="0", a query is made in step #320 to see if the defocus speed VH0 determined in step #313 is greater than a constant VE1. When the response in step #320 is affirmative, namely, when VH0>VE1, the limit value of in-focus INFZ is set at a constant FZREL1 in step #321 and, when the response in step #320 is negative, namely, when VH0≦VE1, the limit value of in-focus INFZ is set at a constant FZREL2 in step #322. The limit value of in-focus FZREL1 is smaller than the limit value of in-focus FZREL2. That is, when the focusing speed VH0 is low, the object is considered to be stationary. In such a case, the limit value of in-focus can be large since the variation in the amount of defocus is affected scarcely by the movement of the object. When the defocus speed VH0 is high, a small limit value of in-focus is selected since the variation in the amount of defocus is high. Since the limit value of in-focus is determined as described above, the photographic lens is driven slightly for a stable, rapid continuous photographing operation when the object is stationary. A highly accurate continuous photographing operation with a small delay in the prediction operation can be achieved by selecting a small limit value of in-focus when the defocus speed VH0 is higher than a predetermined defocus speed VE1. The constants VE1, FZREL1 and FZREL2 are stored in the EEPROM of the CPU 201 and are arbitrarily rewritable.

In step #323, a query is made to see if the limit value of in-focus INFZ set in step #321 or #322 is greater than a detected amount of defocus DF0. When the response in step #323 is affirmative, it is considered that the photographic lens is in-focus position at a sufficiently high accuracy, and the program goes to step #370 to decide if the switch SW6 is closed. If the switch SW6 is closed, it means that a shutter release operation is requested and therefore a shutter release operation for the next photographing cycle is started in step #371. That is, since the photographic lens is in-focus accurately, the shutter release operation is carried out for the next photographing operation in step #371 without driving the photographic lens during the lifting up of the mirrors. When the decision in step #370 is negative, namely, when the switch SW6 is open, the program branches off the step #372 to execute a prediction mode cancelling routine OUTRV. In the prediction cancelling routine OUTRV, the continuous photographing mode flag VLYF and the initial prediction flag T1STF are set to "0" in steps #373 and #374, and then the routine jumps from step #375 to step #105 to execute the focus detecting routine CDINTA for the next photographing cycle.

On the other hand, when the decision in step #323 is negative, namely, when the detected amount of defocus is greater than the limit value of in-focus INFZ, a query is made in step #324 to see if the brightness of the object is low. More specifically, the brightness is determined on the basis of a time required for accumulating charge in the CCD and a gain obtained by multiplying output data. When the response in step #324 is affirmative, the magnification $\beta$ of the image is calculated in step #325. In step #326, a query is made to see if the magnification $\beta$ of image is greater than a constant BETALOCK. The program branches to step #333 when $\beta >$ BETALOCK or goes to step #327 when $\beta \leq$ BETALOCK. In step #327, a query is made to see if the defocus speed VH0 is greater than a constant RVMIN. The program branches off to step #333 when VH0 $\leq$ RVMIN or goes to step #328 when VH0 > RVMIN. In step #328, a query is made to see if the focusing speed VH0 is smaller than a constant RVMAX. The program branches to step #333 when VH0 $\geq$ RVMAX or goes to step #329 when VH0 < RVMAX. In step #329, a query is made to see if the direction of the present defocus speed VH0 is the same as that of the last defocus speed VH1. The program branches to step #336 when the response in step #329 is negative or goes to step #330 when the response in step #329 is affirmative. In step #330, a query is made to see if the initial prediction flag T1STF is "1". The program branches to step #335 when the response in step #330 is negative to set the initial prediction flag T1STF to "1". When the response in step #330 is affirmative, the prediction mode flag TF is set to "1" in step #331, and then the routine jumps to a prediction routine RNAFT1.

The prediction mode for correcting variation in the amount of defocus caused by the movement of the object is determined through steps #323 through #332. More specifically, when it is decided that the brightness of the object is low in step #324, it is impossible to select the prediction mode because a comparatively long time is necessary for charge accumulation in the CCD, noise signals increase, and hence it is impossible to determine the defocus speed VH0 accurately. When it is decided that the magnification of the image is large in step #326, it is also impossible to select the prediction mode because camera shake affects the determination of the defocus speed VH0 significantly. When the response in step #327 is negative, namely, when VH0 $\leq$ RVMIN, it is impossible to decide whether the variation in the amount of defocus is attributable to variation in focus detection or to the movement of the object. Accordingly, to avoid erroneous correction, the prediction mode is not selected. Since the moving speed of the object is low, variation in the amount of defocus is negligibly small even if the variation is caused by the movement of the object, and hence the focus condition need not be corrected. When the response in step #328 is VH0 $\geq$ RVMAX, it is considered that the variation in the amount of defocus is abnormally large. Such a condition is considered to be due not to the movement of the object, but due to the change of the object for another object, in other words it is decided that the camera is intendedly aimed at another object. Accordingly, the prediction mode cannot be selected.

When the response in step #329 is negative, namely, when the present defocus speed VH0 and the last defocus speed VH1 are different from each other in direction, it is decided the focus detecting operation is unstable or the object is moving irregularly. Accordingly, erroneous correction is highly possible and hence the prediction mode cannot be selected When the decisions in steps #323 to #329 are made twice successively by executing steps #330, #331 and #335, the prediction mode is selected. Thus, it is surely decided whether or not the object is a moving object. Accordingly, there is no possibility of erroneous correction. The constants BETALOCK, RVMIN and RVMAX are stored beforehand in the EEPROM of the CPU 201.

When the response in step #329 is negative, an unstable focus detecting operation or unstable movement of the object is expected. Therefore, the program goes to step #336 to execute the prediction mode cancelling routine OUTRV3. In step #337, the prediction mode flag TF, the initial prediction flag T1STF and the continuous photographing mode flag VLYF are set to "0", and then the program goes to step #338 to execute the focus detecting routine CDINTA for the next photographing cycle in step #105 and the following steps. Since the routine is thus executed, the next shutter release operation is forbidden and, as mentioned with reference to FIG. 7, the photographic lens is driven until the same is brought into in-focus condition again. Accordingly, there is no possibility of execution of the photographing operation before the photographic lens is focused.

When the program branches from step #324, #326, #327, #328 or #330 to step #333, the present amount of defocus DF0 is compared with a constant INFZE1 to see if DF0 < INFZE1. When the decision in step #333 is affirmative, the amount of defocus is not very large and the reliability of focus detection is high. The photographic lens can be in-focus position at a sufficiently high accuracy even if the photographic lens is driven for focusing during the upward movement of the mirrors before the next shutter release operation. Therefore, the program branches to step #382 for a photographic lens driving routine RNMTR, which is executed during the upward movement of the mirrors. When DF0 $\geq$ INFZE1, the amount of defocus is comparatively large and hence possibility remains that the photographic lens cannot accurately be in-focus when the next shutter release operation is started without correcting the in-focus condition of the photographic lens. Accordingly, the program goes to step #334 to execute the prediction mode cancelling routine OUTRV2. When the amount of defocus is comparatively small, highly accurate automatic focusing and a rapid continuous photographing operation can be achieved by driving the photographic lens during the upward movement of the mirrors through steps #333 and #334. On the other hand, when the amount of defocus is comparatively large, the focus detecting operation is repeated once again to focus the photographic lens, the photographic lens can automatically be focused at a high accuracy. When the program proceeds to the out-of-focus treatment OUTFS through prediction mode cancelling routine OUTRV2 starting from step #334, the focus detecting operation is performed again, as mentioned with reference to FIG. 6, after driving the photographic lens to cancel the present amount of defocus DF0, and hence the focusing condition of the photographic lens can be quickly and accurately detected. The constant INFZE1 is stored beforehand in the EEPROM 201f of the CPU 201 and arbitrarily rewritable.

Figure 10A:
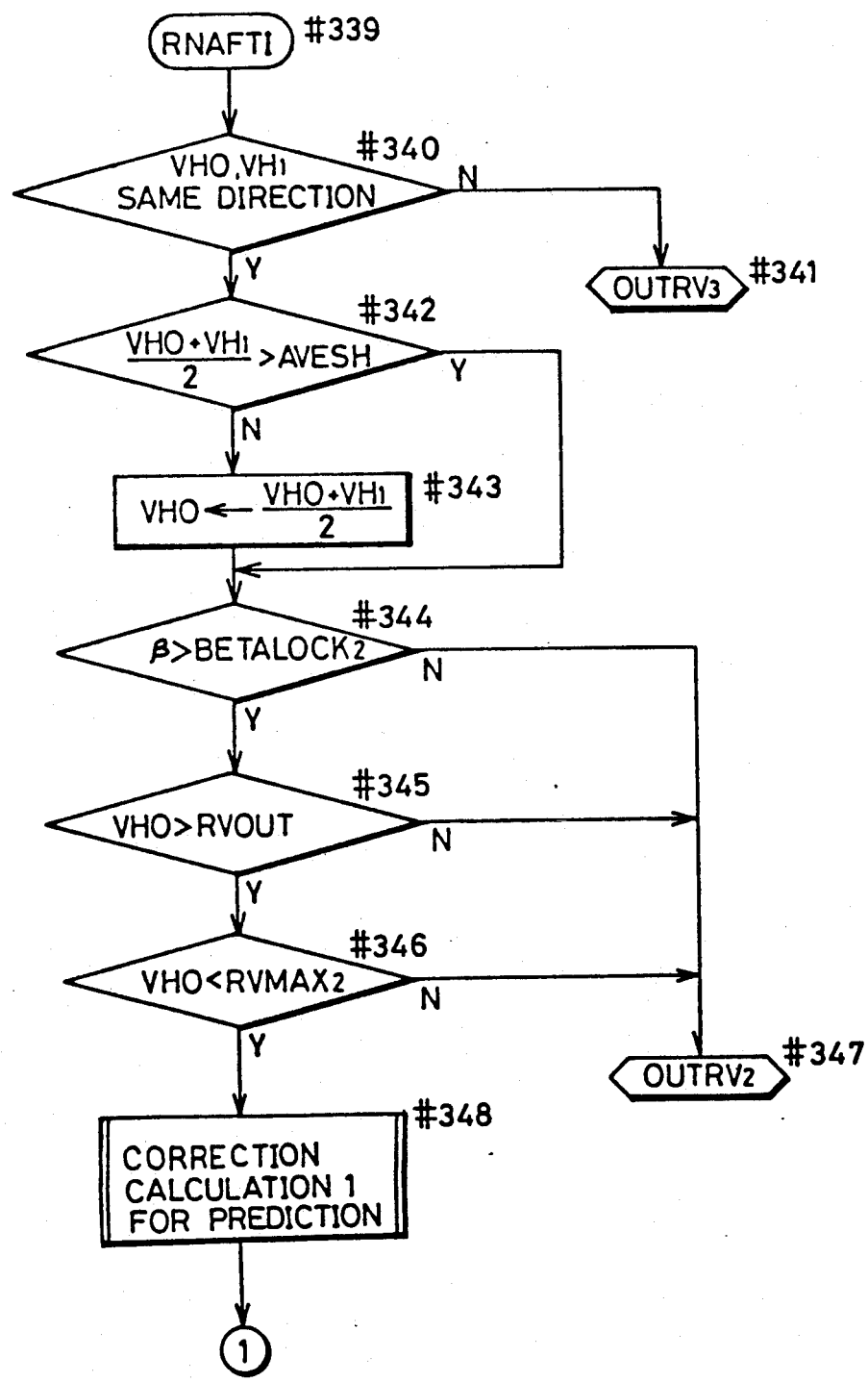

The prediction routine RNAFTI (step #332 or #381) will be described with reference to FIG. 10. In step #340, a query is made to see if the present defocus speed VH0 and the last defocus speed VH1 are the same in direction. When the response in step #340 is negative, it is considered that the object has suddenly stopped, the direction of movement of the object has changed or the camera has shaken in such a case, and the program branches to step #341 to execute the prediction mode cancelling routine OUTRV3. Then, the automatic focusing operation is performed until the photographic lens is focused again. Thus, the photographic lens can be focused at a high accuracy without entailing erroneous correction even if the object stops suddenly, the direction of movement of the object changes or the camera shakes.

When the response in step #340 is affirmative, a query is made in step #342 to see if (VH0+VH1)/2 is greater than a constant AVESH. The indication (VH0+VH1)/2 indicates a weighted mean $$\sum_{i=0}^{n} (VH_i/2^i)/2$$

(as is derived from step #310), where n is the number of loops, and $VH_i$ is the defocus speed determined in i-th cycle before the present detecting cycle. In step #324, a query is made to see if the weighted means is greater than a constant AVESH. When the response in step #324 is negative, the present defocus speed is changed for the weighted mean in step #343. When the response in step #342 is affirmative, the routine jumps to step #344. That is, variations in the result of focus detection are absorbed by using the weighted mean when the defocus speed is low for stable focus correction. Since the variation of the amount of defocus increases substantially in inverse proportion to the square of the subject distance when the object approaches the camera at a constant speed, the foregoing operation is effective for focus correction of a high response speed and less delay in following-up when the focusing speed is high. The constant AVESH is stored beforehand in the EEPROM 201f of the CPU 201. In step #344, the magnification β of image is calculated and a query is made to see if the magnification of image is greater than a constant BETALOCK2. As mentioned before, the influence of camera shake on the focusing operation is significant when the magnification of image is large. Therefore, the program goes to step #347 to execute the prediction mode cancelling routine OUTRV2. The constant BETALOCK2, which is set to be greater than the constant BETALOCK, is stored beforehand in the EEPROM 201f of the CPU 201. In step #345, a query is made to see if the present defocus speed VH0 is greater than a constant RVOUT. When the response in step #345 is negative, the present defocus speed VH0 is sufficiently low, and hence the program branches to step #347 to avoid erroneous correction attributable to variation in the result of focus detection. In step #346, a query is made if the present defocus speed is lower than the constant RVMAX2. When the response in step #346 is negative, it is considered that the defocus speed is very high and the prediction correction is unable to predict the variation of the focus entailing a large amount of defocus. Accordingly, the program branches to step #347. In step #347, the prediction mode cancelling routine OUTRV2 is executed to cancel the prediction mode, whereby the next shutter release operation is forbidden and the focus detecting operation is performed again. Thus, the shutter release operation is forbidden when the object moves at a very high speed to avoid taking a photograph without prediction. Steps #344 through #346 prevent erroneous correction and ensure highly accurate correction.

Figure 11:
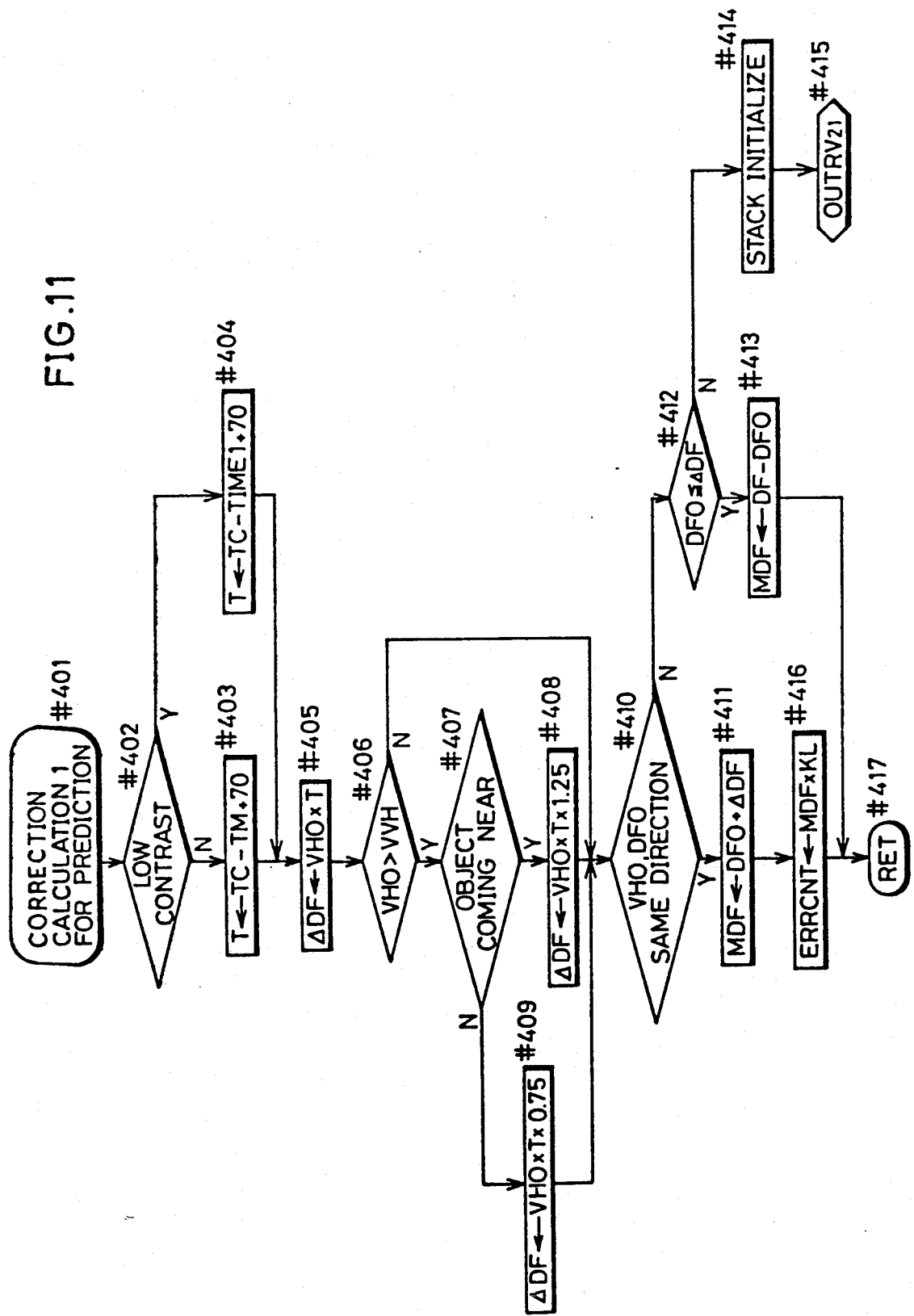

Then, in step #348, a prediction correction calculation 1 is executed to calculate a number of driving pulses ERRNCT, which will be described afterward with reference to FIG. 11. In step #349, a query is made to see if the amount of defocus MDF determined by prediction correction is smaller than a constant INFZE2. When the response in step #349 is negative, the program branches to step #350 to enhance the accuracy by executing a prediction mode cancelling routine OUTRV21 including step #316 and the following steps (FIG. 9). In the above steps, only the continuous photographing mode flag VLYF is set to "0", the prediction mode is maintained, and then the out-of-focus routine is executed. The constant INFZE2 is stored beforehand in the EEPROM 201f of the CPU 201. The constant INFZE2 is set to be greater than the constant INFZE1 described in step #333 because the routine is unable to advance to step #351 if the amount of correction for prediction correction is not large.

Step #351 and the following steps are for the photographic lens driving routine to be executed during the lifting-up movement of the mirrors when the response in step #333 is affirmative or when the response in step #349 is affirmative. In step #352, a query is made to see if the switch SW6 is closed. When the response in step #352 is negative, namely when the next shutter release operation is not requested, the program branches to step #363 to execute the prediction mode cancelling routine OUTRV. When the response in step #352 is affirmative, query is made in step #353 to see if the number of driving pulses ERRNCT is not greater than the constant NP1. As mentioned above, (FIG. 6), the constant NP1 is the number of driving pulses which can be generated during the lift-up of the mirrors. When the response in step #353 is affirmative, the photographic lens can be driven properly during the upward movement of the mirrors. Then, the routine jumps to step #359.

When the response in step #353 is negative, a time corresponding to the duration of the lift-up of the mirrors is insufficient to drive the photographic lens properly, and hence an additional time is required before starting the next shutter release operation. The time necessary for focussing the photographic lens by driving the AF motor $M_2$ depends on the condition of the power supply and the characteristics of the photographic lens. To absorb the difference in the time necessary for focusing the photographic lens attributable to those conditions, a fixed time allowance of 40 msec is given before starting the next shutter release operation. When the number of driving pulses ERRCNT corresponds to a time on the order of 40 msec and less than the constant NP2, the AF motor $M_2$ is actuated. When the number of driving pulses ERRCNT is greater than the constant NP2, the focus detecting operation is performed again. Thus, the focus of the photographic lens can be corrected accurately by a degree corresponding to 40 msec even in taking a moving object. Furthermore, even if the photographing operation is withheld for 40 msec, a continuous photographing speed of 3 frames/sec is reduced merely to 2.7 frames/sec, so that a desired continuous photographing operation can be carried out substantially without any restriction. Still further, when the number of driving pulses ERRCNT is greater than the constant NP2, the focus detecting operation is performed again, which solves a problem in the conventional camera that an error resulting from focus detection driving the photographic lens increases without any restriction.

When ERRCNT > NP1 (step #353), a query is made in step #354 to see if the prediction flag TF is set to "1". When the response in step #354 is affirmative (TF=1), a prediction correction calculation 2 for calculating pulses corresponding to 40 msec in step #355. When the response in step #354 is negative (TF=0), step #355 is skipped. In step #356, a query is made to see if the number of driving pulses ERRCNT is not greater than the constant NP2. When the response in step #356 is negative, the program branches to step #364 to execute the prediction mode cancelling routine OUTRV2. When the program branches from step #349 to step #350 for the prediction mode cancelling routine OUTRV2 or from step #356 to step #364 for the prediction cancelling routine OUTRV2 to drive the lens during the upward movement of the mirrors before the next shutter release operation without performing the focus detecting operation again, it is decided that the photographic lens is focused and the in-focus indication is maintained.

Subsequently, in step #357, the AF motor M2 is actuated. The routine is withheld for a latency of 40 msec in step #358. When the response in step #353 is affirmative, the AF motor m2 is actuated in step #359. Then, in step #360, a continuous shutter release routine RNRELESE is started. Since the camera is set for the continuous photographing mode, the routine is withheld for a predetermined latency of $t_{11}$ in step #361 to stop the film perfectly, and then the shutter release operation is executed in step #362. As is obvious from the foregoing description, the variation in the amount of defocus due to the movement of the object must be corrected in the prediction mode. Accordingly, the next shutter release operation is not performed with the photographic lens stopped.

The prediction correction calculation will be described hereinafter with reference to FIG. 11. In step #402, a query is made to see if the result of focus detection shows that the contrast of the object is low. When the response in step #402 is negative, a time T for correction is calculated in step #403. The present, accumulation central time is stored in the memory TM. A time interval between the present accumulation central time and the next exposure operation is determined by: TC −TM+70 (msec), where TC is the present time registered by the timer and 70 msec is time required for mirror lifting-up. When the contrast of the object is low, a time interval T between time when the last exposure operation was performed and time when the next exposure operation is to be performed is determined in step #404. As mentioned with reference to FIG. 7, the time when the last exposure operation was performed is stored in the memory TIME1. Accordingly, the time interval T is obtained by subtracting the time stored in the memory TIME1 from the present time TC and adding 70 (msec) to the remainder. That is, the time T is calculated in step #403 on the basis of the present amount of defocus DF0 when the response in step #402 is negative, and when the time T is calculated in step #404 on an assumption that the amount of defocus in the last exposure operation was zero when the response in step #402 is affirmative.

In step #405, the defocus speed VH0 is multiplied by the time T obtained in step #403 or #404 to obtain a correction DF. Then, in step #406, a query is made to see of the defocus speed VH0 is greater than a constant VVH. When VH0 > VVH, namely, when the defocus speed is higher than a predetermined level, a query is made in step #407 to see if the object is coming up to the camera. When the response in step #407 is affirmative, the correction DF is multiplied by 1.25 in step #408, because the defocus speed increases in inverse proportion to the square of the subject distance when the object is coming up to the camera along the optical axis of the photographic lens at a constant speed. Accordingly, when the object approaches the camera at a high speed, the amount of defocus increases in the time T obtained in step #403 or #404, and hence the correction DF is multiplied by 1.25 to correct the variation in the amount of defocus attributable to the movement of the object toward the camera. When the object is going away from the camera, the defocus speed decreases, and hence the correction DF is multiplied by 0.75 in step #409.

In step #410, a query is made to see if the present amount of defocus DF0 and the defocus speed VH0 are the same in direction. When the response in step #410 is affirmative, a corrected amount of defocus MDF is obtained in step #411 by adding the correction ΔDF to the amount of defocus DF0. When the response in step #410 is negative, a query is made in step #412 to see if DF0 ≦ ΔDF. When the response in step #412 is affirmative, a corrected amount of defocus MDF is obtained by subtracting the amount of defocus DF0 from the correction ΔDF. When the response in step #412 is negative (DF0 > ΔDF), the photographic lens must be driven in a direction reverse to the direction of the defocus speed, because the large amount of defocus DF0 is reverse to the direction of the defocus speed. When the response in step #412 is negative, stack initialization is executed in step #414 to deal with an error attributable to backlashes between the gears of a photographic lens driving mechanism in reversing the photographic lens driving direction or the abnormal action of the object, and then the program goes to step #415 to execute the prediction mode cancelling routine OUTRV21. Consequently, the next shutter release operation is withheld and the focus detecting operation is performed again. After the corrected amount of defocus MDF has been determined in step #411 or #413, the corrected amount of defocus MDF is multiplied by the convergence coefficient KL (a coefficient for converting the amount of defocus into corresponding number of driving pulses) in step #416 to determine a number of driving pulses ERRCNT, and then the program returns in step #417.

Thus, the photographic lens can accurately be in in-focus position even if the object is moving at a high speed regardless of the direction of movement of the object with respect to the camera. As is obvious from the description made with reference to FIG. 9, a correction corresponding to the movement of the object can accurately be determined even if the low contrast of the object is neglected once in steps #308 through #312.

Timer interrupt and AFP interrupt will be described hereinafter with reference to FIGS. 12 and 13.

Figure 12:
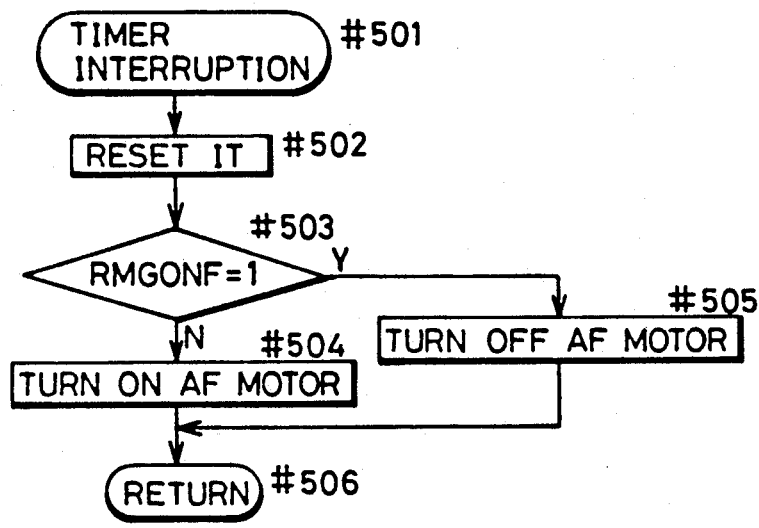

Referring to FIG. 12 showing a timer interrupt routine for driving the AF motor M$_2$, the CPU 201 is provided internally with an interrupt signal requesting timer interrupt after a set time has passed. When the timer interrupt signal is provided, the interrupt timer IT is reset in step #502 to make the interrupt timer IT generate next timer interrupt signal after a set time from a moment when the present timer interrupt signal is generated. In step #503, a query is made to see if the flag RMGONF=1. When the response in step #503 is affirmative, namely when the shutter release magnet RMg is energized, the AF motor M$_2$ is stopped in step #505. When the response in step #503 is negative, namely, when RMGONF =0, the AF motor M$_2$ is actuated in step #504, and the program goes to step #506 to return.

Figure 13:
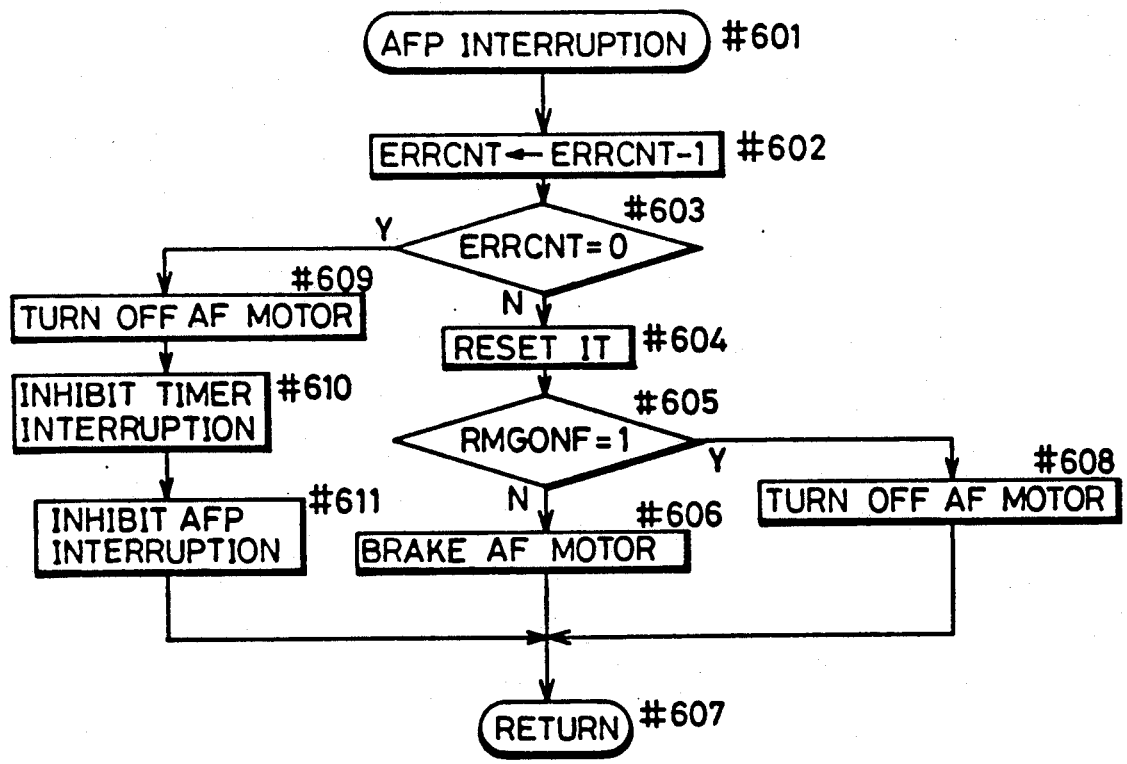

Referring to FIG. 13 showing an AFP interrupt routine to be executed at the trailing edge of an AFP signal, the number of driving pulses ERRCNT is reduced by "1" in step #602 upon the generation of the AFP signal. In step #603, a query is made to see if the number of driving pulses ERRCNT has decreased to zero and thereby the AF motor M$_2$ being stopped. When the response in step #603 is negative, the interrupt timer IT is reset in step #604. In step #605, a query is made to see if the flag RMGONF=1. When the response in step #605 is affirmative, namely, when the shutter release magnet RMg is energized, the AF motor M$_2$ is stopped in step #608. When the response in step #605 is negative, the AF motor M$_2$ is braked in step #606, and then the program goes to step #607 to return. On the other hand, when the response in step #603 is affirmative, the AF motor M$_2$ is stopped in step #609, timer interrupt is forbidden in step #610, AFP interrupt is forbidden in step #611, and then the program goes to step #607 to return.

Thus, the AF motor M$_2$ is driven in the timer interrupt mode and the AFP interrupt mode, and the AF motor M$_2$ is stopped while the shutter release magnet RM$_g$ is energized.

Figure 14:
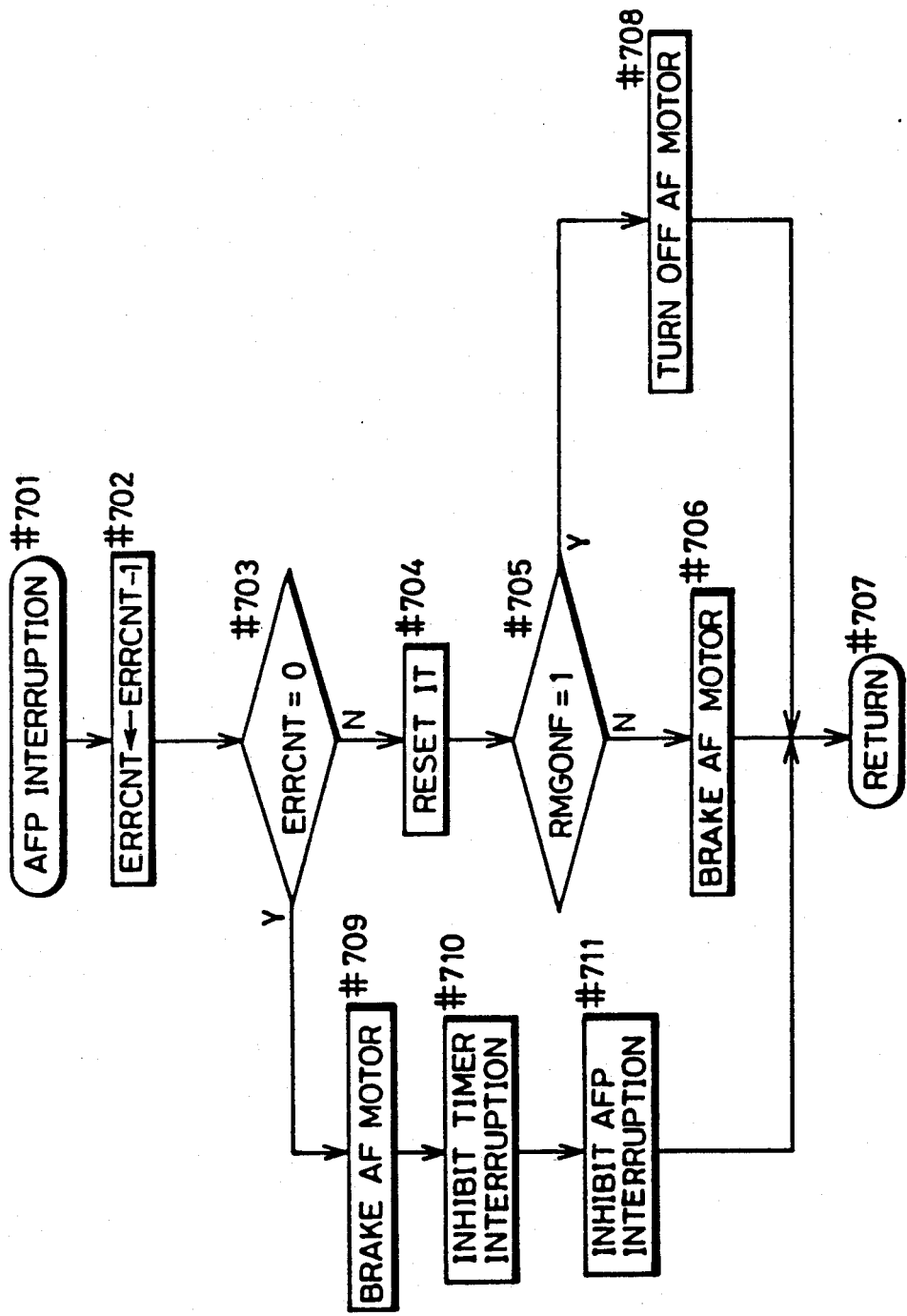
FIG. 14 is a flow chart explaining another embodiment of the operation.

Referring to FIG. 14, another embodiment of the present invention is described. "AF motor OFF" in the step #609 of FIG. 13 is replaced by the step #709 "AF brake" in FIG. 14. In this embodiment, if the power supply to the AF motor is turned OFF while the release magnet (RMg) is conductive and when the lens is moved by a prescribed amount in order to prevent driving of the lens by the inertia of the AF motor (ERRCNT=0, #703), then the brake is applied to the AF motor. Therefore, the lens is stopped exactly at the prescribed position, preventing defocus.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A camera, comprising:
   (a) a first actuator;
   (b) a second actuator;
   (c) power supply means for supplying electric power to said first and second actuators;
   (d) first controlling means for causing said first actuator to operate a predetermined operation;
   (e) suspending means for suspending said power supply to said first actuator without braking said first actuator, said suspending means allowing said first actuator to continue operation due to inertia; and
   (f) second controlling means for controlling said suspending means such that when said power supply to said first actuator is suspended, said power supply is applied to said second actuator in order to actuate said second actuator in advance of completion of the predetermined operation of said first actuator, and for resuming the power supply to said first actuator to complete the remaining operation of said first actuator after said second actuator has finished operation.

2. A camera according to claim 1, wherein said first actuator is a motor and carries out a prescribed operation.

3. A camera according to claim 2, wherein said second actuator comprises an electromagnet.

4. A camera according to claim 1, further comprising:
   a lens for focusing an object; and shutter releasing means for exposing a film; wherein
   said first actuator comprising a motor for driving said lens, and
   said second actuator comprises an electromagnet for driving said shutter releasing means.

5. A camera according to claim 4, wherein said controlling means suspends power supply to said motor immediately before exposure of said film.

6. A camera, comprising:
   (a) a first actuator;
   (b) a second actuator;
   (c) power supply means for supplying electric power to said first and second actuators;
   (d) suspending means for suspending said power supply to said first actuator without braking said first actuator, said suspending means allowing said first actuator to continue operation due to inertia;
   (e) controlling means for controlling said suspending means such that said power supply to said first actuator is suspended before said second actuator is actuated, and for resuming the power supply to said first actuator after completion of operation of said second actuator;
   (f) a driven member driven by said first actuator;
   (g) monitoring means for detecting an amount of movement of said driven member and for outputting a detecting signal when the amount of movement reaches a prescribed value; and
   (h) movement stopping means responsive to said detecting signal for stopping movement of said first actuator.

7. A camera according to claim 6, wherein said first actuator comprises a motor, and said second actuator comprises an electromagnet.

8. A camera according to claim 7, further comprising:
   a lens for focusing an object; and shutter releasing means for exposing a film; wherein
   said first actuator comprises a motor for driving said lens, and
   said second actuator comprises an electromagnet for driving said shutter releasing means.

9. A camera according to claim 8, wherein said controlling means suspends power supply to said motor immediately before exposure of said film.

* * * * *